(12) United States Patent
Lee

(10) Patent No.: US 10,927,681 B2
(45) Date of Patent: Feb. 23, 2021

(54) GAS TURBINE BLADE

(71) Applicant: DOOSAN HEAVY INDUSTRIES & CONSTRUCTION CO., LTD., Changwon-si (KR)

(72) Inventor: Ki Don Lee, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 120 days.

(21) Appl. No.: 16/084,968

(22) PCT Filed: Aug. 22, 2017

(86) PCT No.: PCT/KR2017/009154
§ 371 (c)(1),
(2) Date: Sep. 13, 2018

(87) PCT Pub. No.: WO2018/038507
PCT Pub. Date: Mar. 1, 2018

(65) Prior Publication Data
US 2020/0300096 A1   Sep. 24, 2020

(30) Foreign Application Priority Data

Aug. 22, 2016 (KR) .................. 10-2016-0106339
Aug. 22, 2017 (KR) .................. 10-2017-0106069

(51) Int. Cl.
*F01D 5/18* (2006.01)
*F01D 5/14* (2006.01)
*F02C 7/18* (2006.01)

(52) U.S. Cl.
CPC ............ *F01D 5/186* (2013.01); *F01D 5/141* (2013.01); *F02C 7/18* (2013.01); *F05D 2220/3212* (2013.01); *F05D 2220/3213* (2013.01); *F05D 2240/301* (2013.01); *F05D 2240/303* (2013.01); *F05D 2240/304* (2013.01);
(Continued)

(58) Field of Classification Search
CPC ................ F01D 5/186; F05D 2250/52; F05D 2260/202; F05D 2260/22141
See application file for complete search history.

(56) References Cited

U.S. PATENT DOCUMENTS

| 6,287,075 B1 * | 9/2001 | Kercher | ................ F01D 5/186 415/115 |
| 7,246,992 B2 * | 7/2007 | Lee | ......................... B23H 9/10 415/115 |

(Continued)

FOREIGN PATENT DOCUMENTS

EP  3156597 A1  4/2017

*Primary Examiner* — Ninh H. Nguyen
(74) *Attorney, Agent, or Firm* — Invenstone Patent, LLC

(57) ABSTRACT

Disclosed herein is a gas turbine blade. The gas turbine blade includes a turbine blade (33) provided in a turbine, and film cooling elements (100), each including a cooling channel (110) for cooling of the turbine blade (33), an outlet (120) through which cooling air is discharged, and a plurality of ribs (130), wherein the outlet (120) extends from a longitudinally extended end of the cooling channel (110) to an outer surface of the turbine blade (33) and has a width increased from one end of the cooling channel (110) to the outer surface of the turbine blade (33), and the ribs (130) face each other on inner walls of the outlet (120).

20 Claims, 26 Drawing Sheets

(52) U.S. Cl.
CPC .. *F05D 2240/305* (2013.01); *F05D 2240/306* (2013.01); *F05D 2250/231* (2013.01); *F05D 2260/202* (2013.01); *F05D 2260/22141* (2013.01); *F05D 2260/232* (2013.01)

(56) References Cited

U.S. PATENT DOCUMENTS

| | | | |
|---|---|---|---|
| 7,762,775 | B1 | 7/2010 | Liang |
| 8,128,366 | B2 * | 3/2012 | Strock .................. F23R 3/002 416/97 R |
| 2008/0031738 | A1 | 2/2008 | Lee |
| 2009/0304494 | A1 | 12/2009 | Strock et al. |
| 2009/0304499 | A1 | 12/2009 | Strock et al. |
| 2016/0153283 | A1 | 6/2016 | Xu et al. |
| 2016/0201474 | A1 | 7/2016 | Slavens et al. |
| 2017/0101870 | A1 * | 4/2017 | Lewis .................. F01D 5/186 |
| 2017/0356295 | A1 * | 12/2017 | Dyson .................. F01D 5/186 |

* cited by examiner

[FIG. 1]
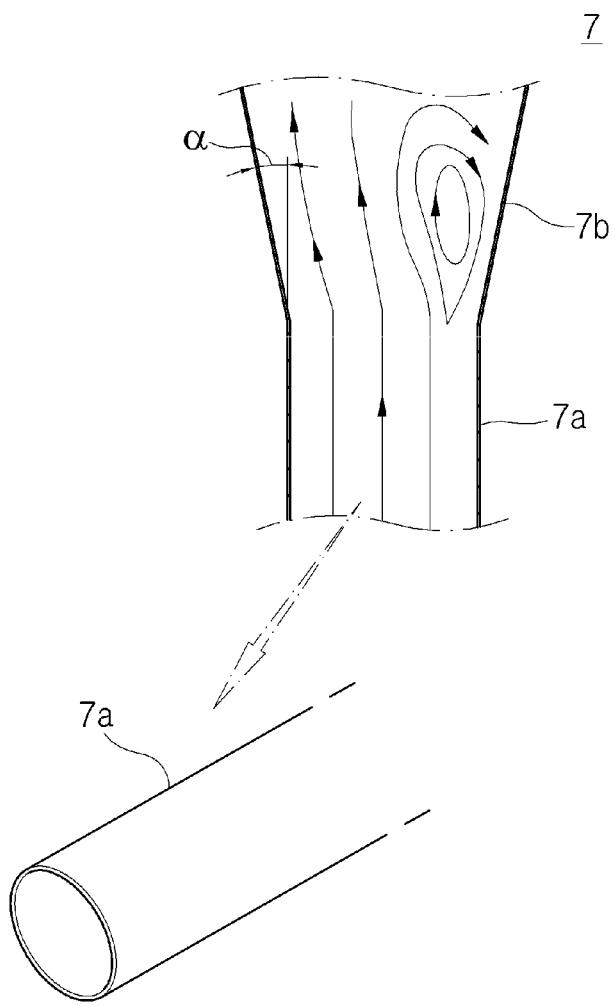

[FIG. 2]
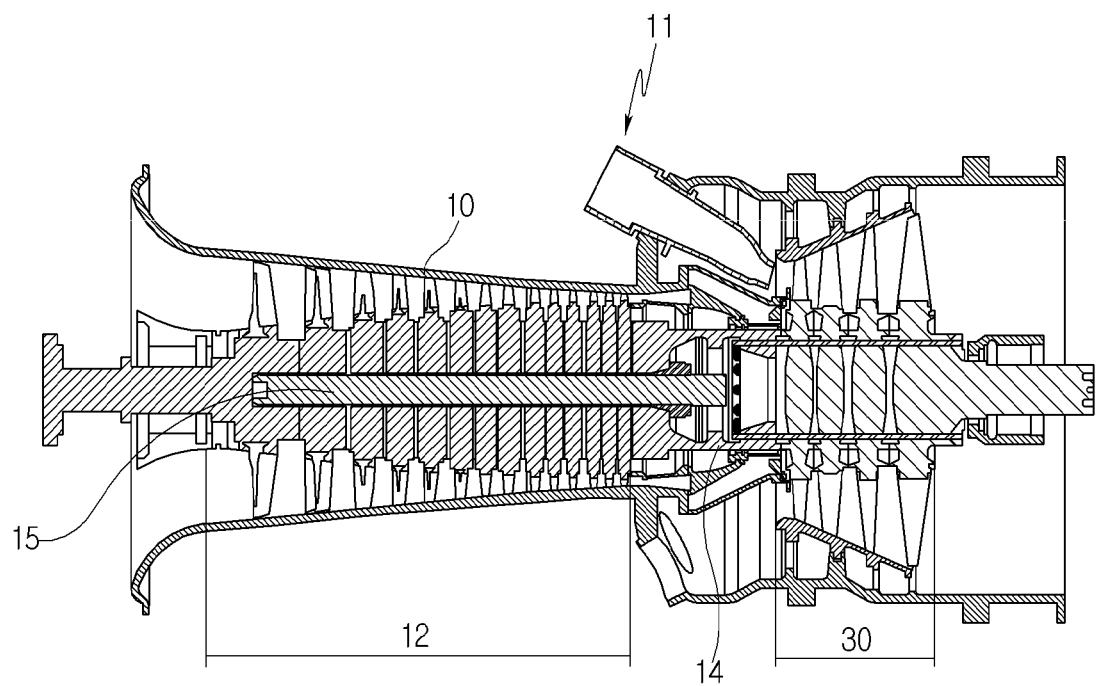

[FIG. 3]
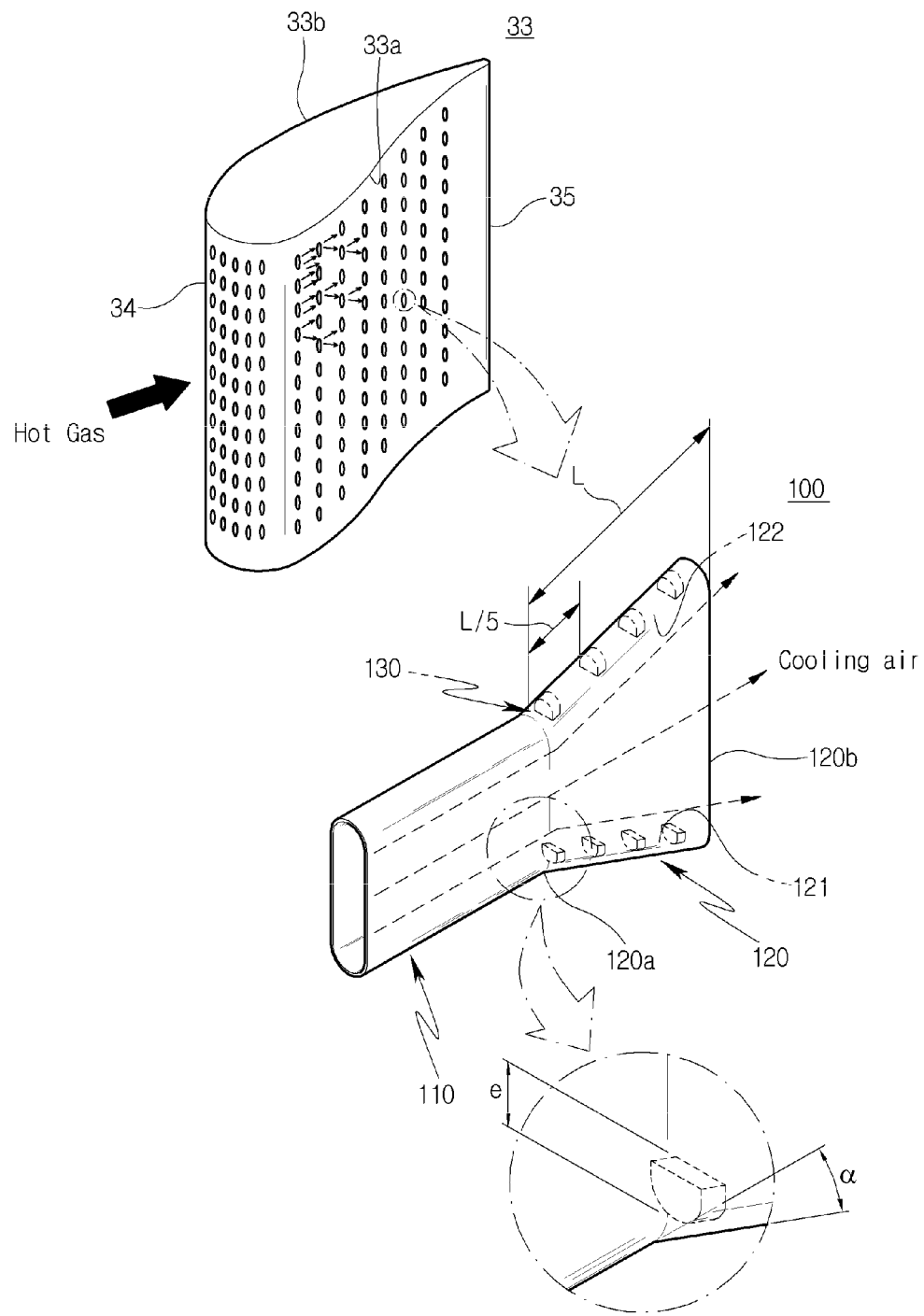

[FIG. 4]
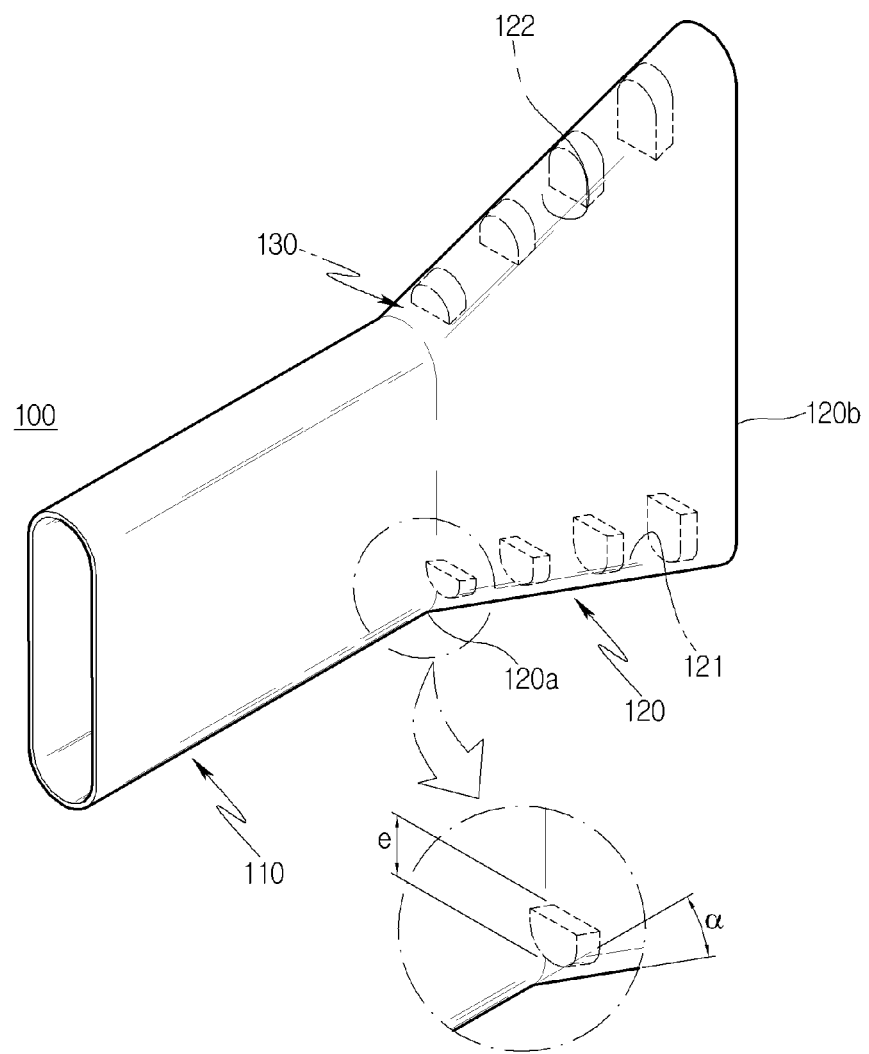

[FIG. 5]
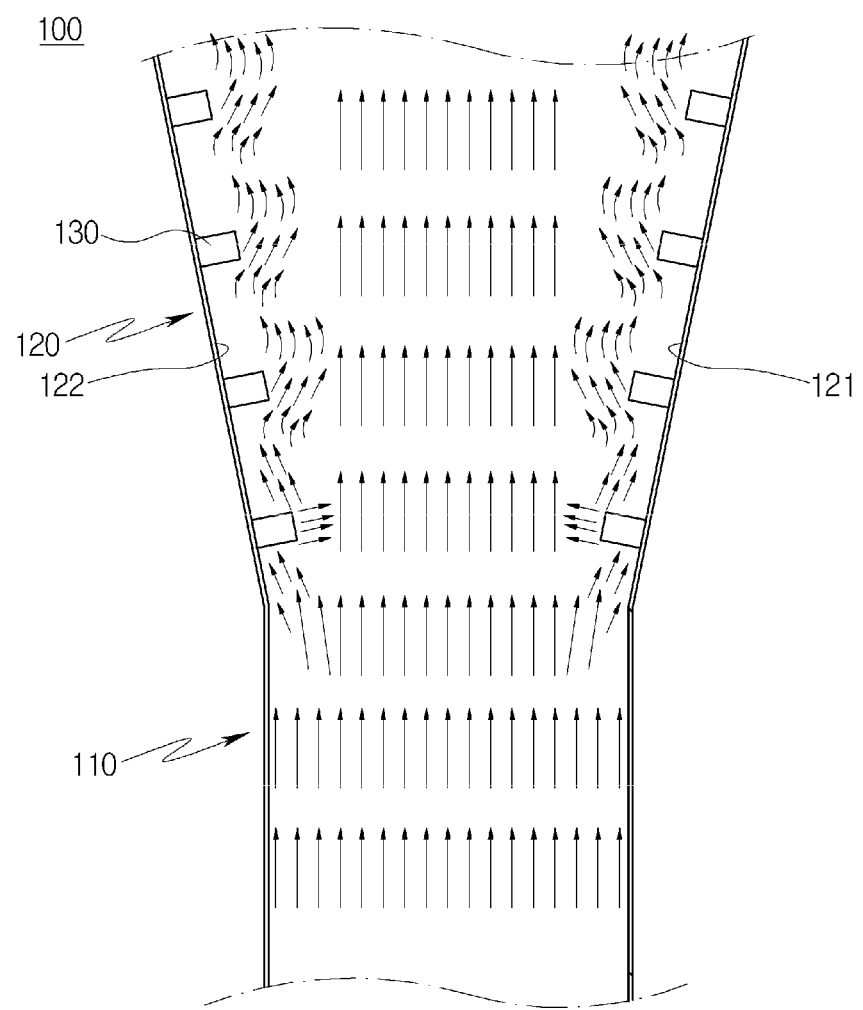

[FIG. 6]
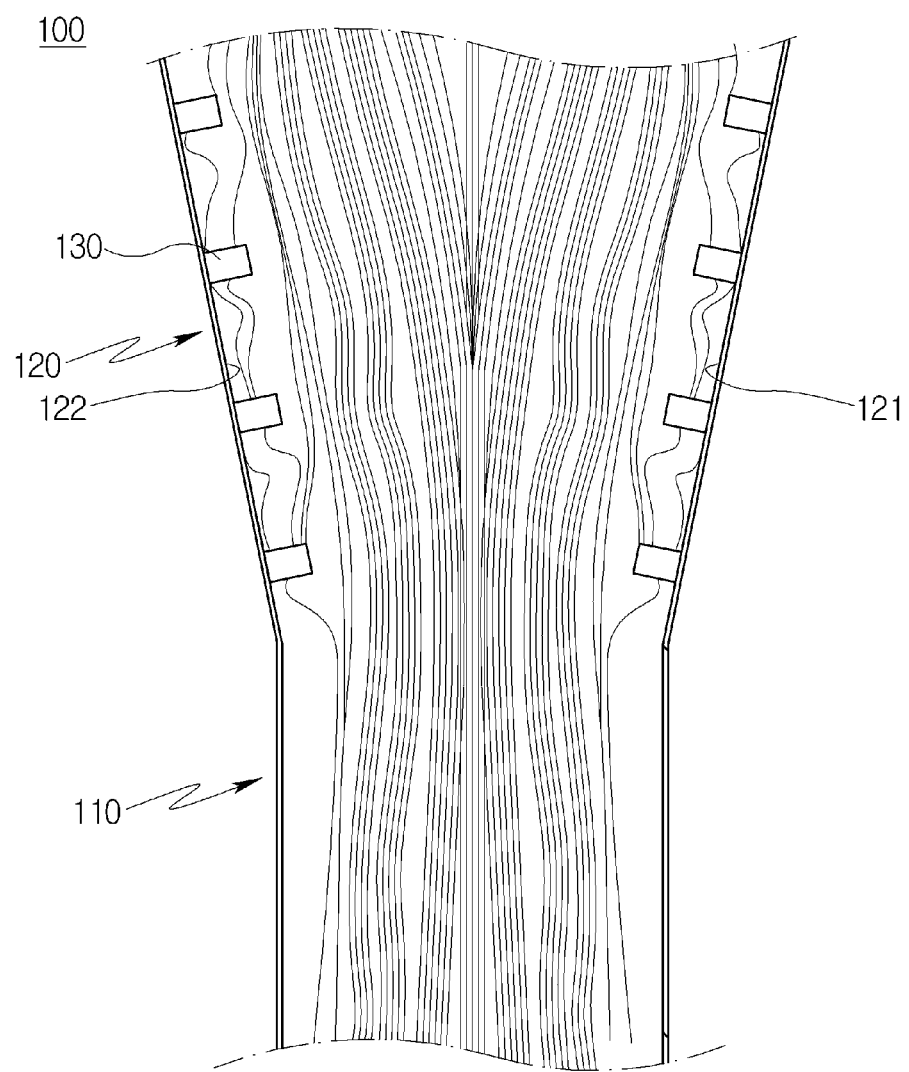

[FIG. 7]
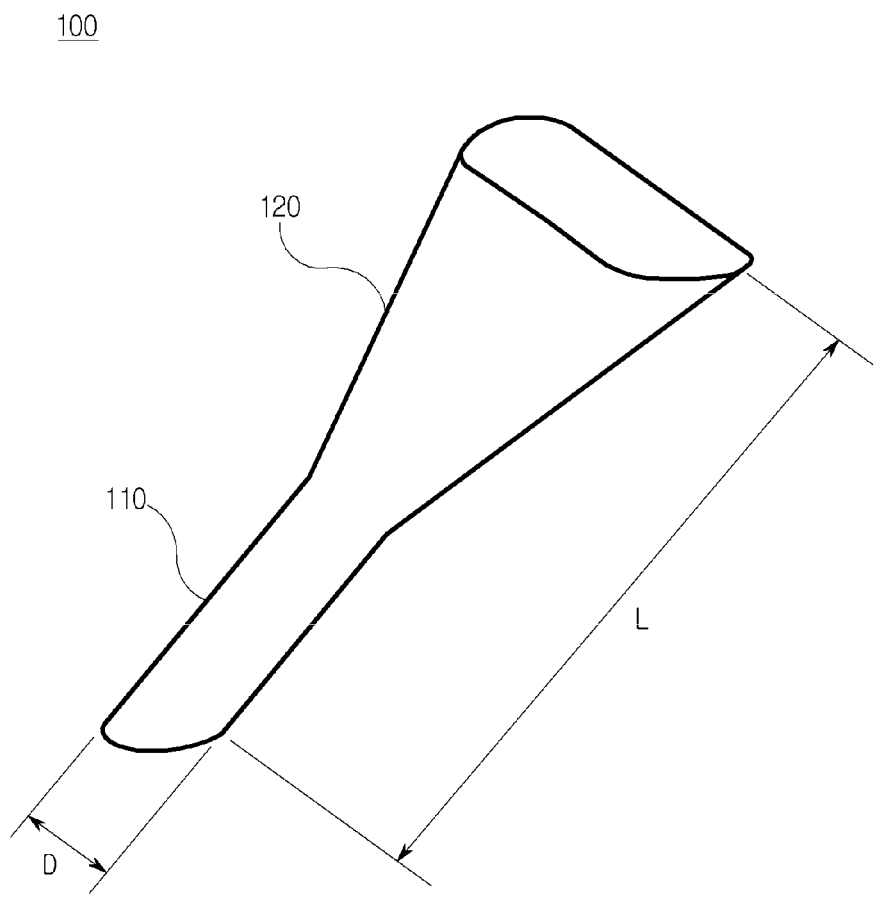

[FIG. 8]
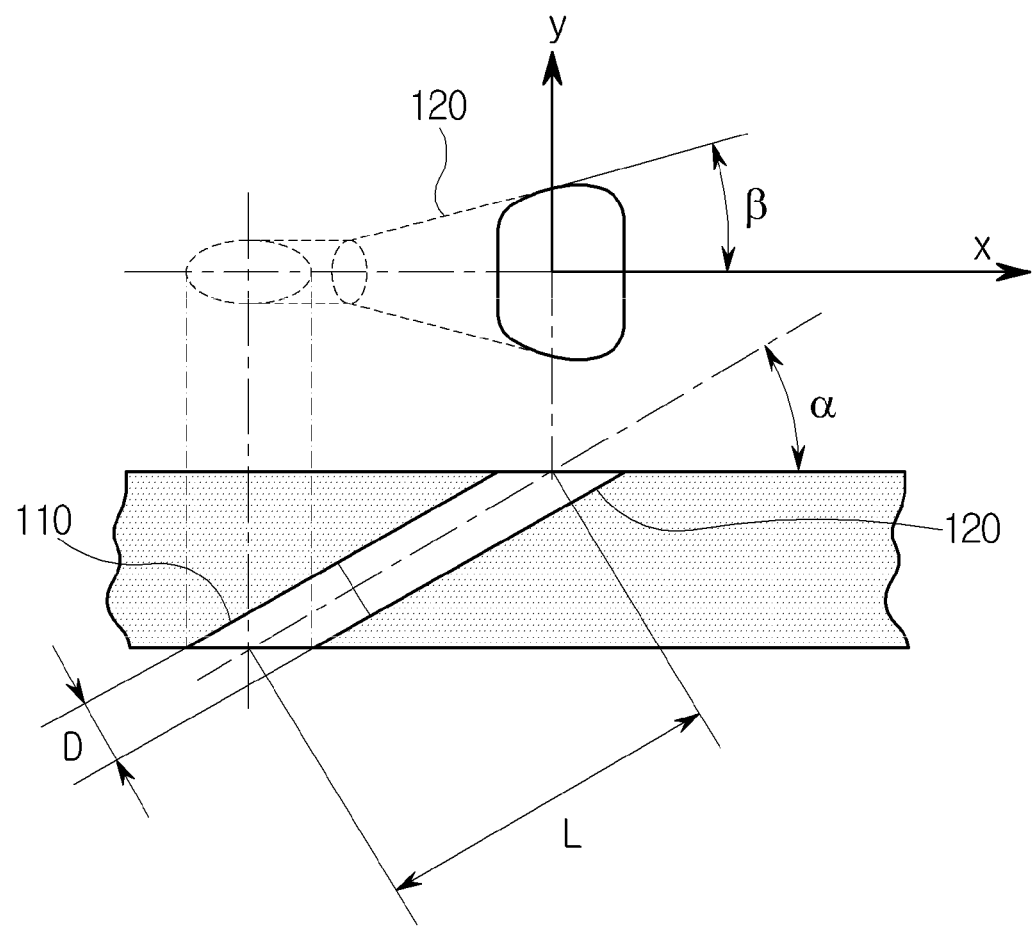

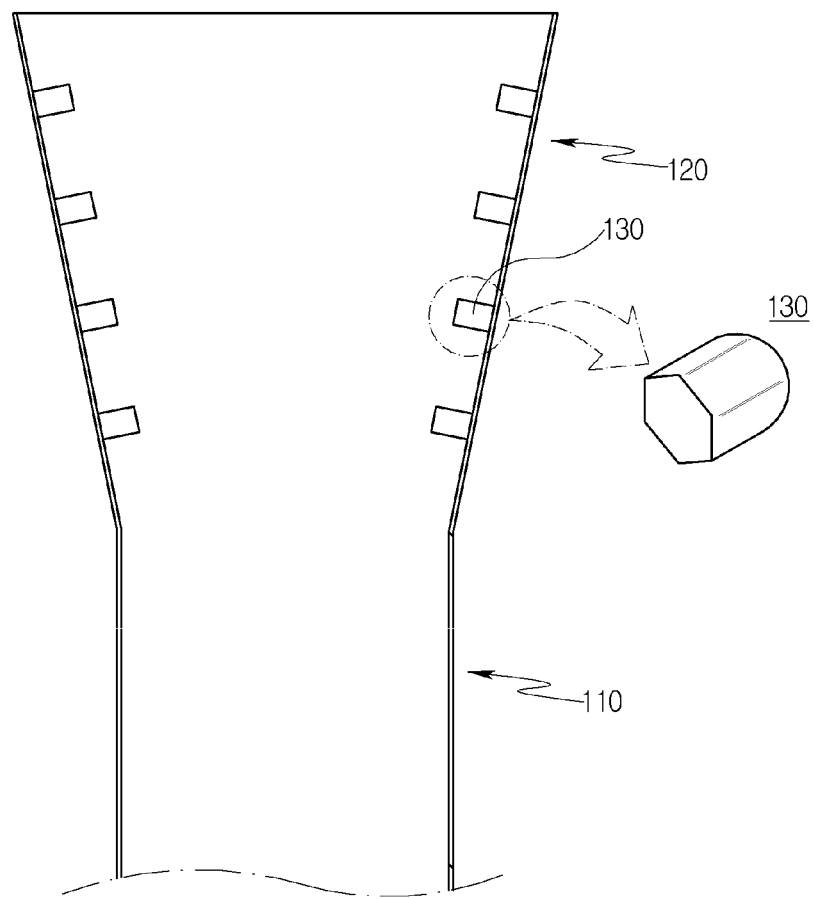
[FIG. 9]

[FIG. 10]
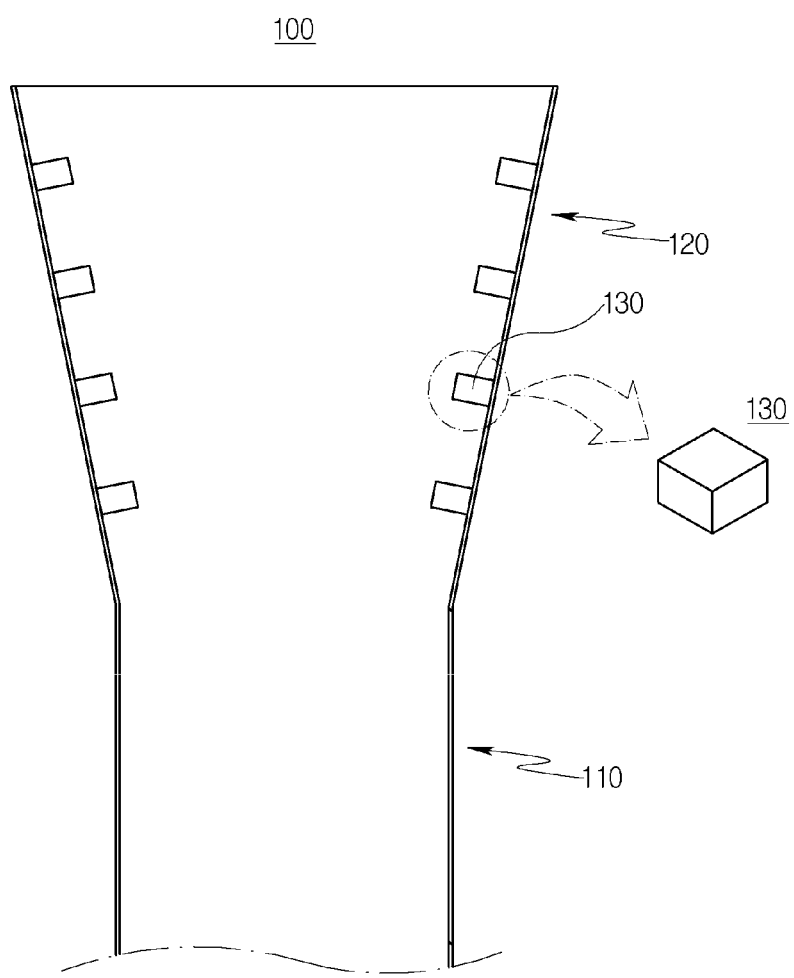

[FIG. 11]
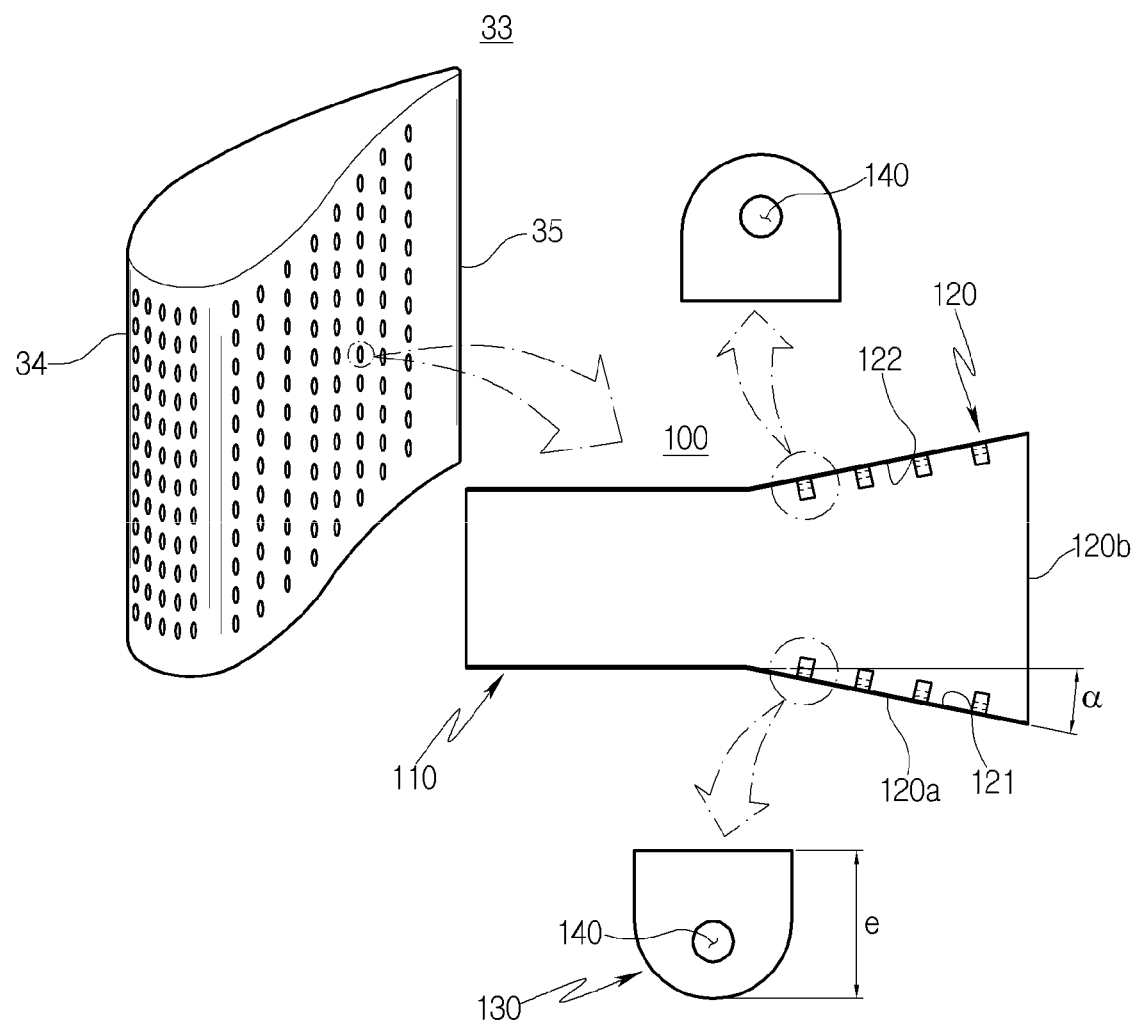

[FIG. 12]
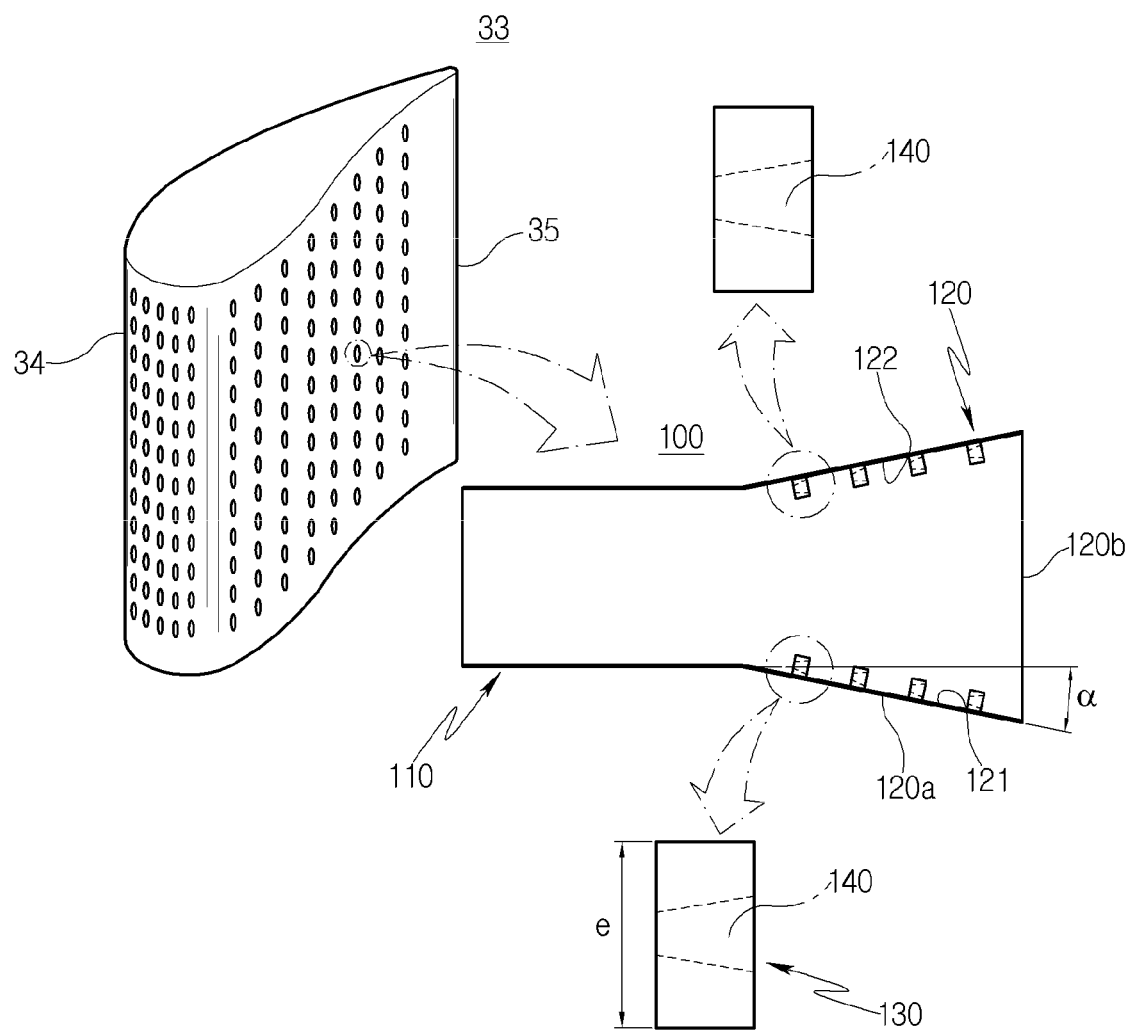

[FIG. 13]
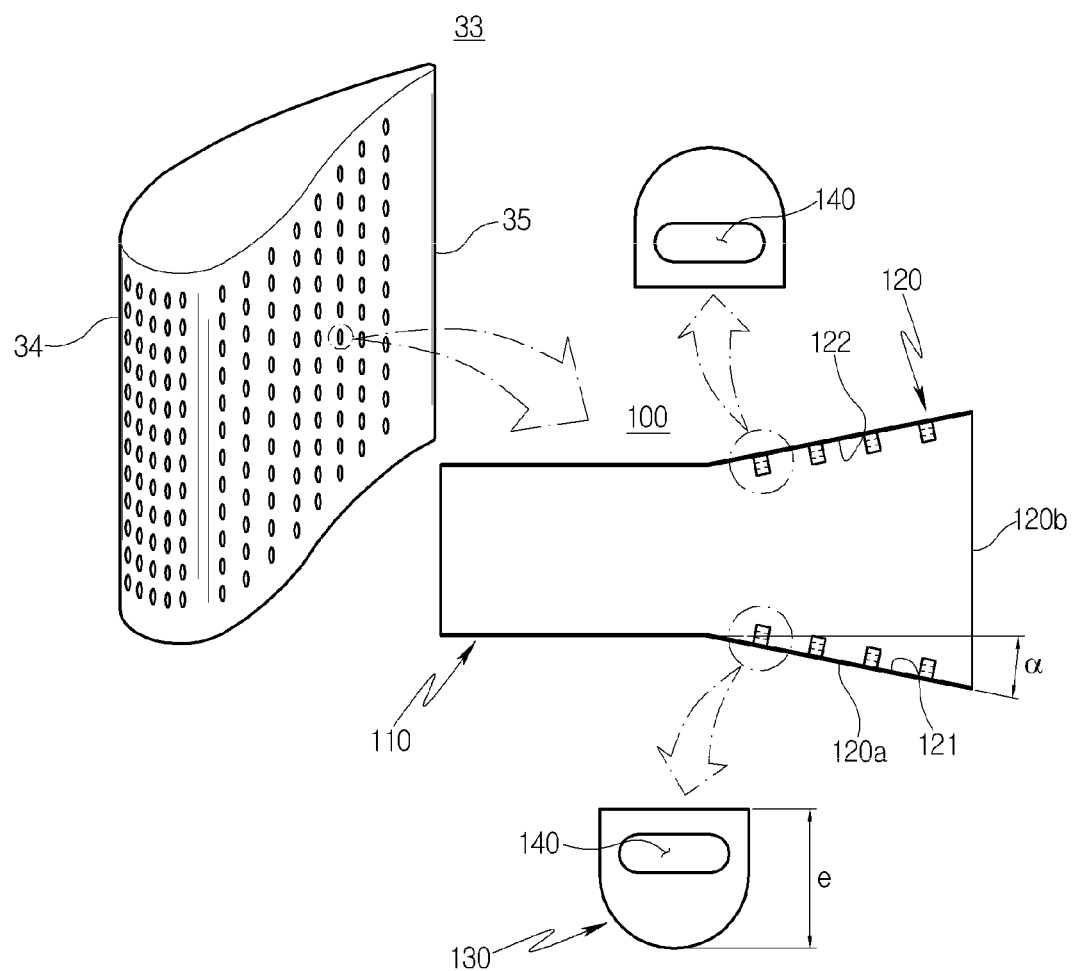

[FIG. 14]
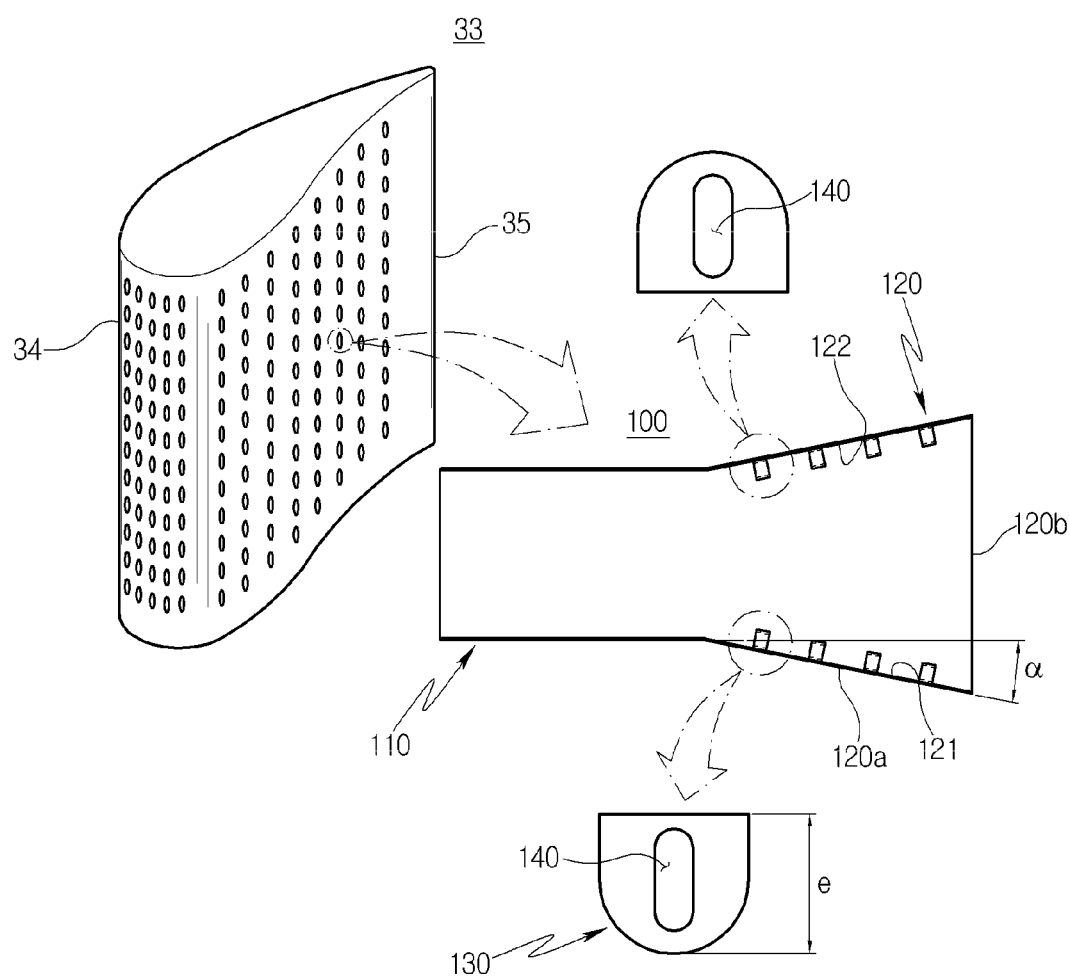

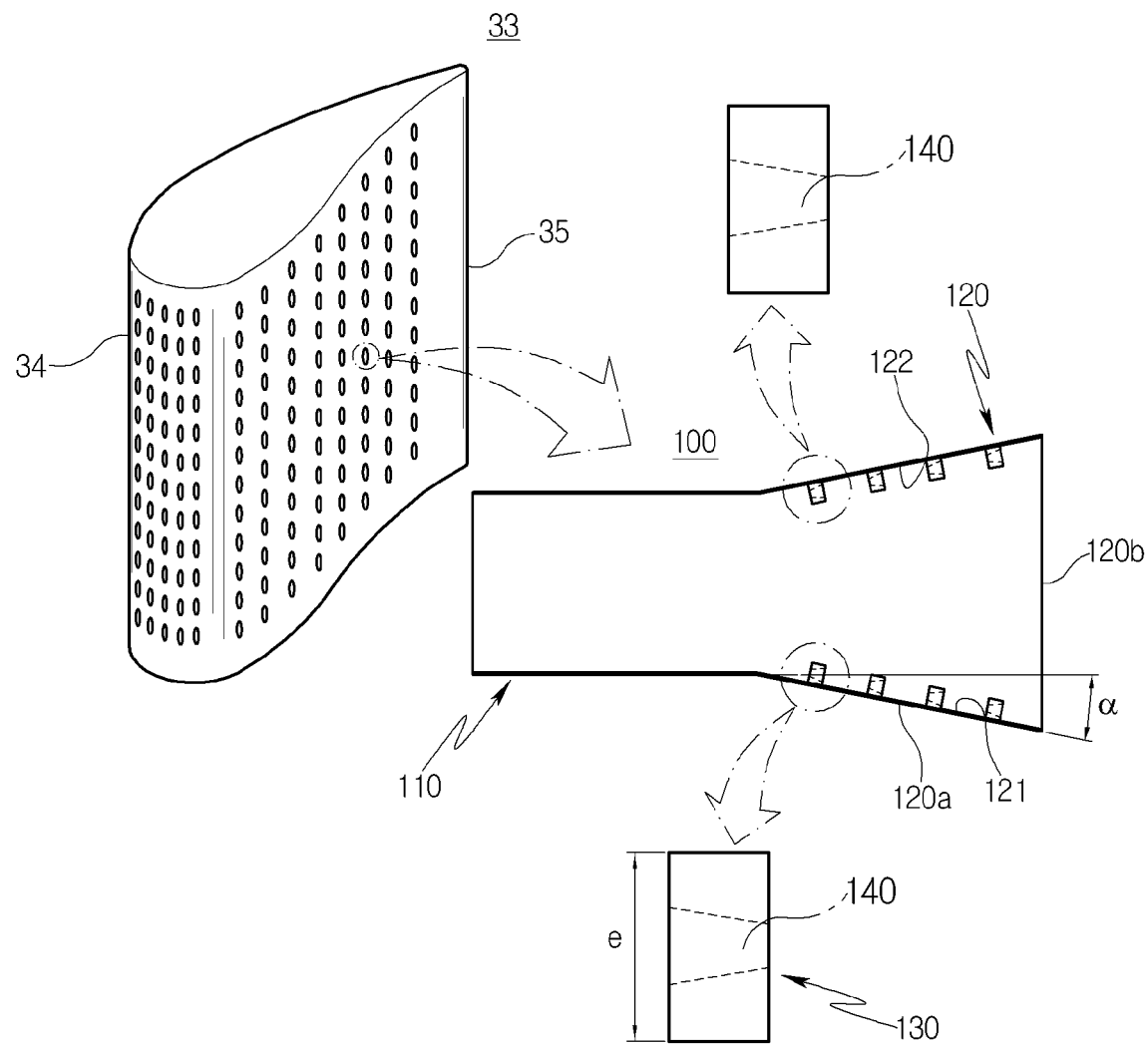
[FIG. 15]

[FIG. 16]
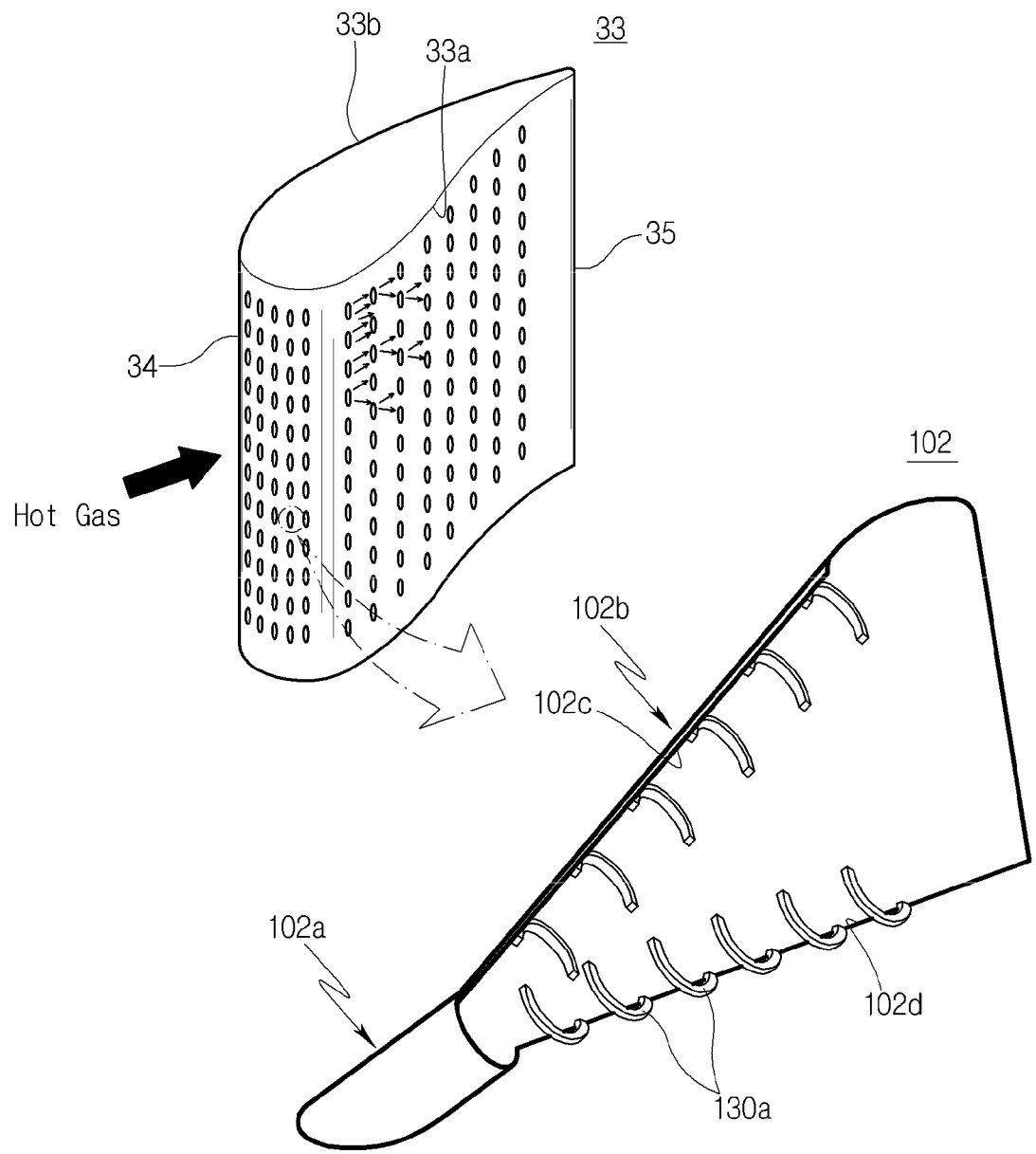

[FIG. 17]
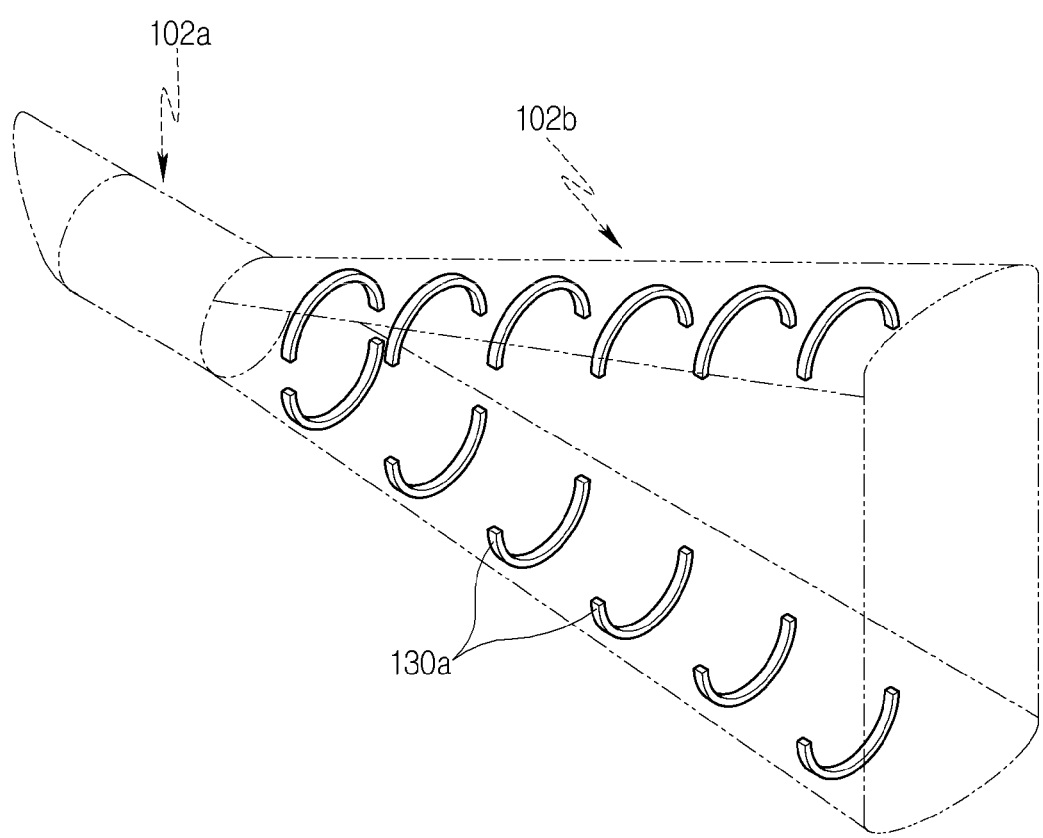

[FIG. 18]
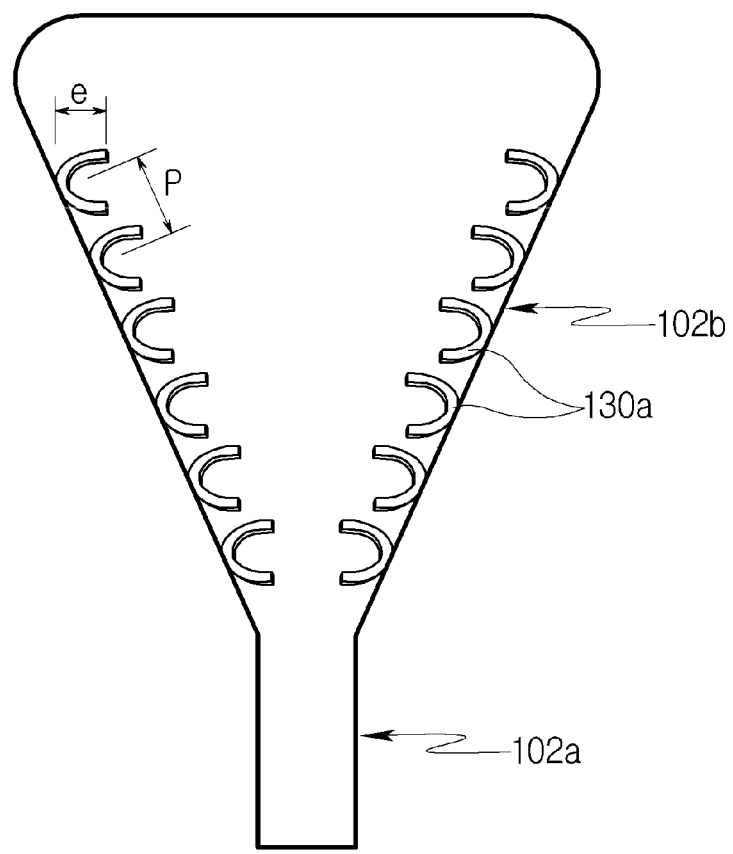

[FIG. 19]
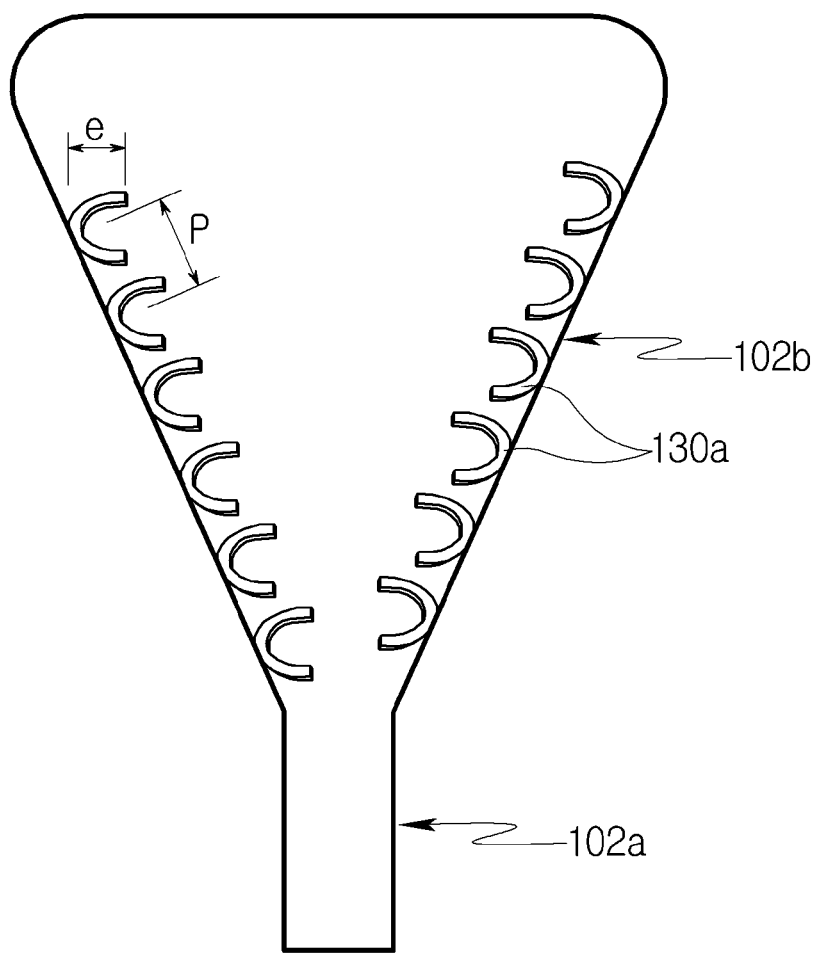

[FIG. 20]
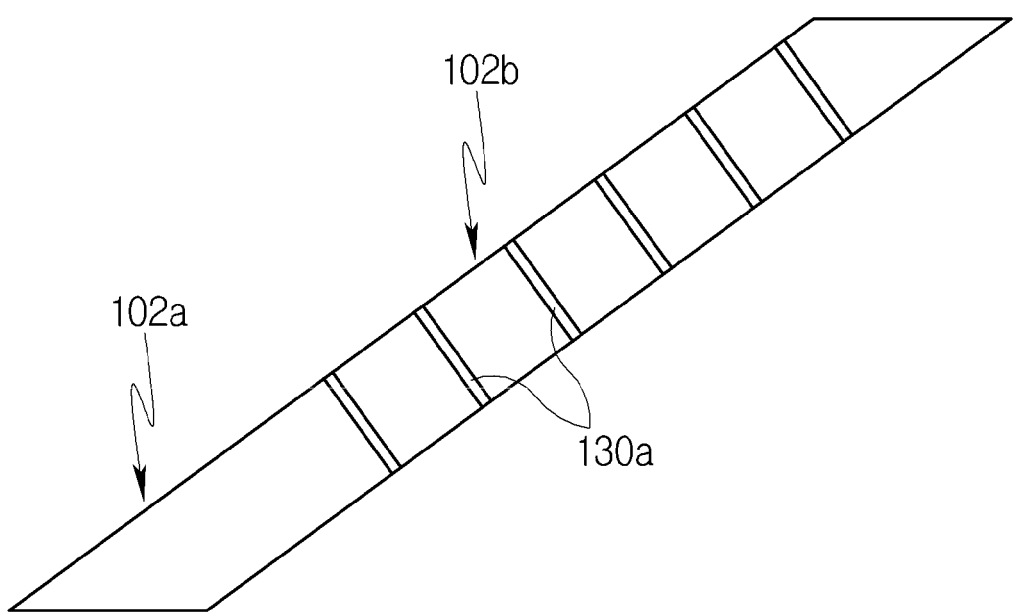

[FIG. 21]
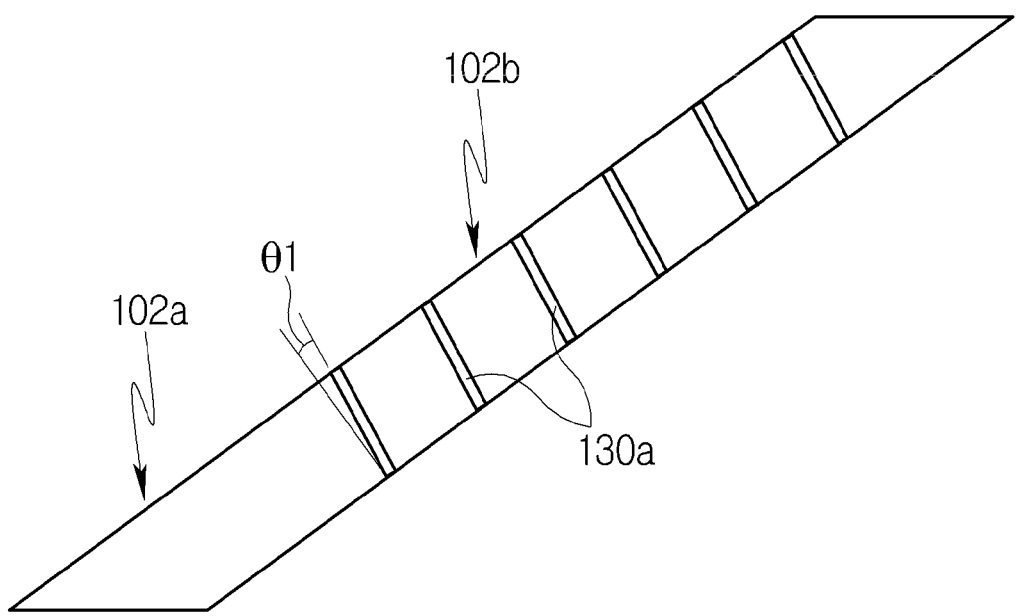

[FIG.22]
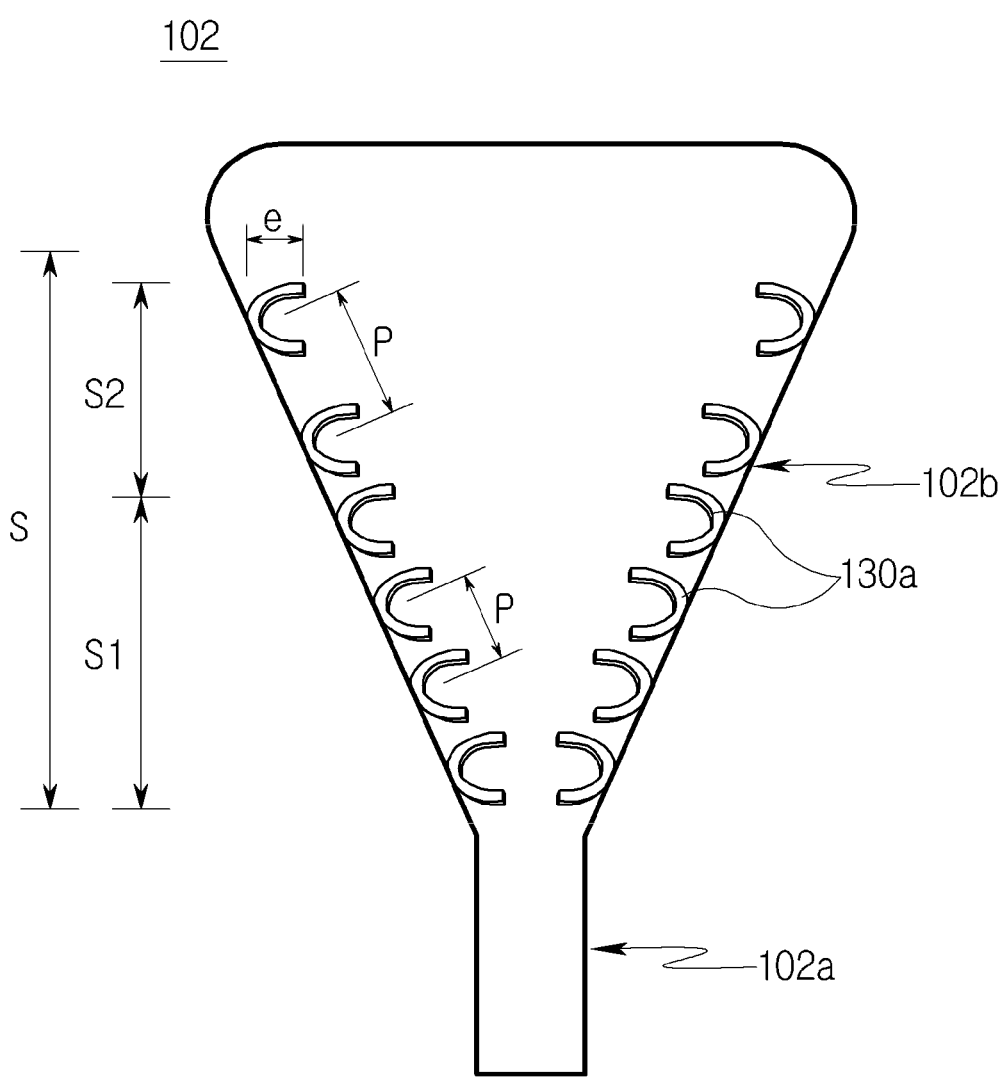

[FIG. 23]
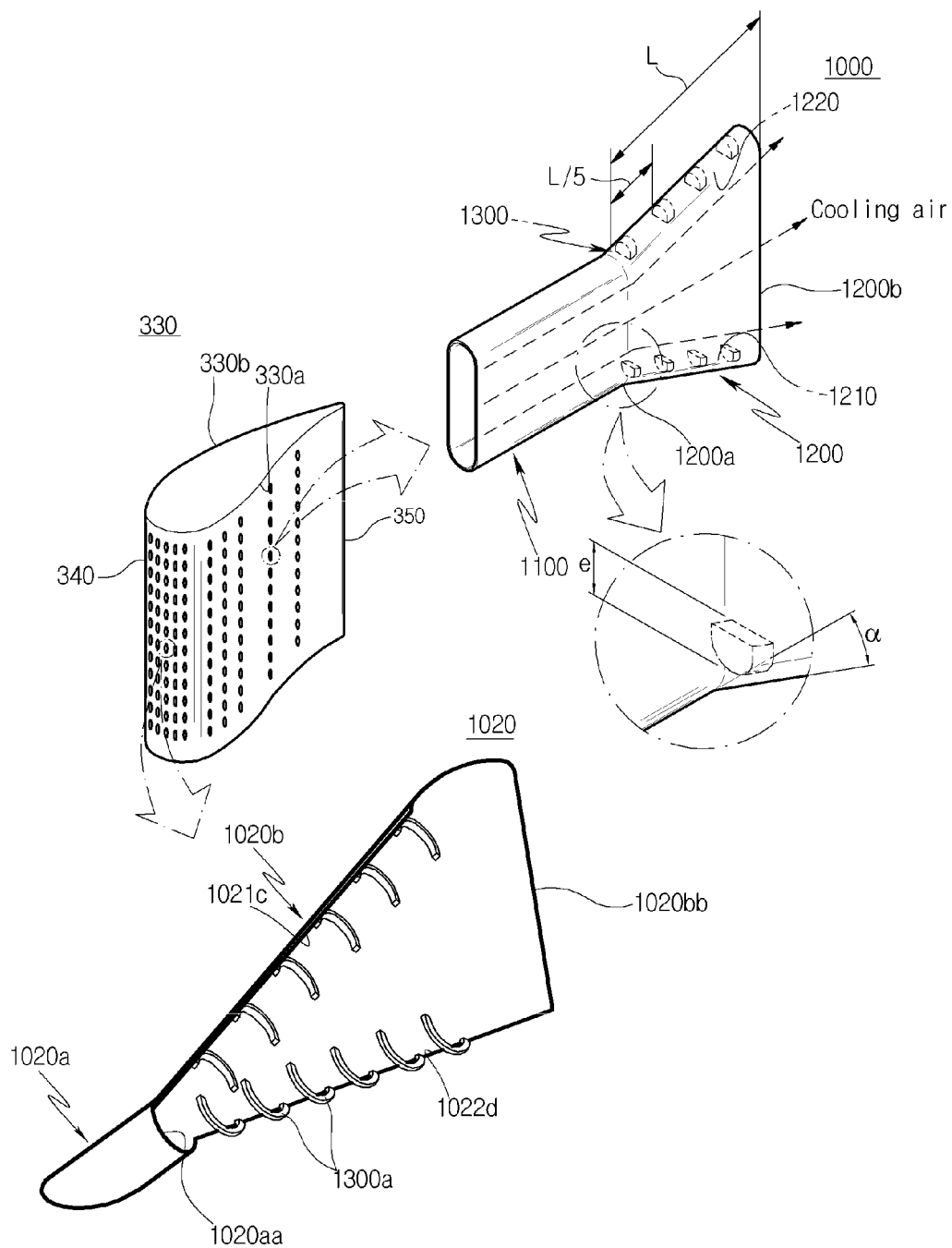

[FIG. 24]
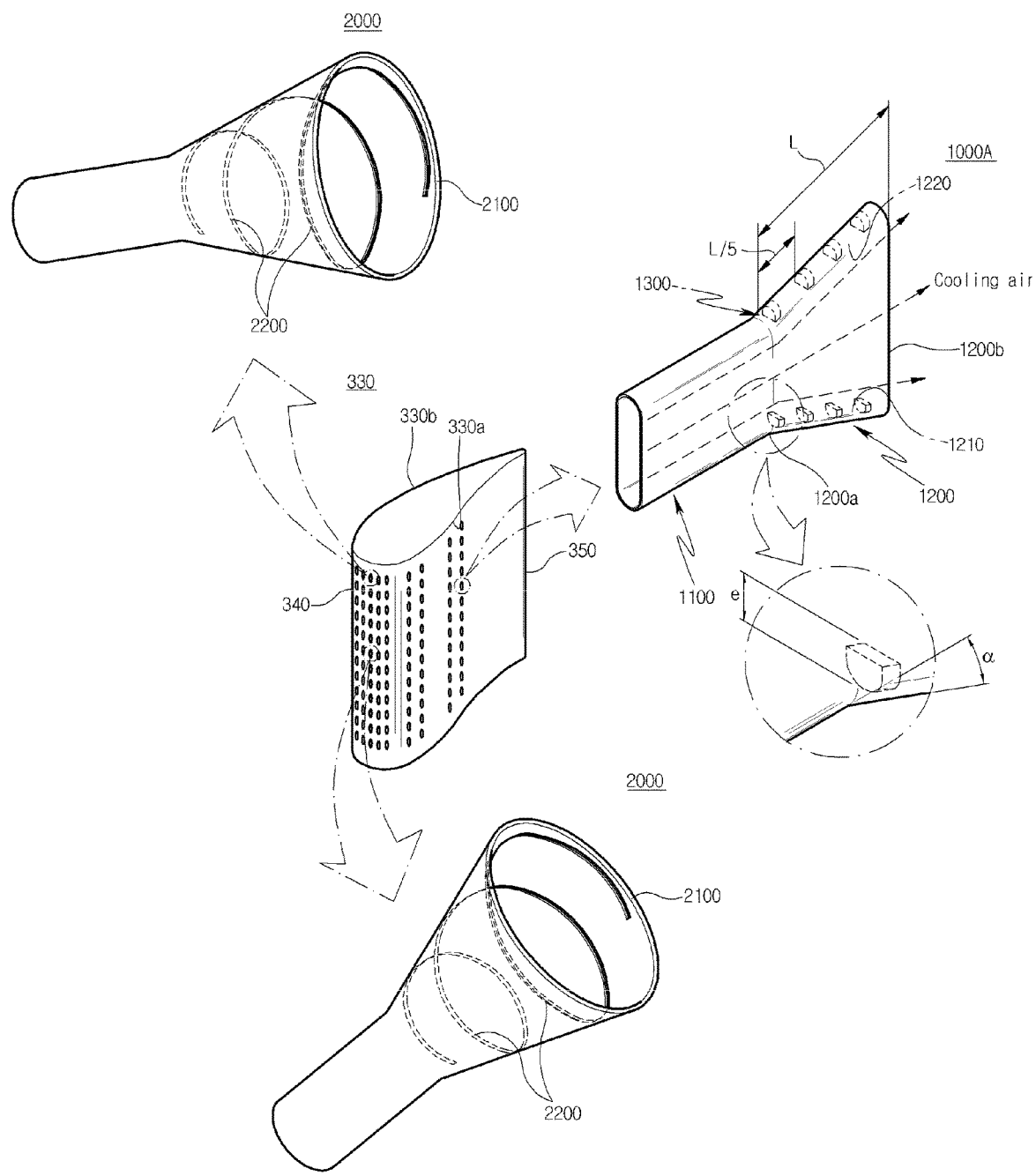

[FIG. 25]
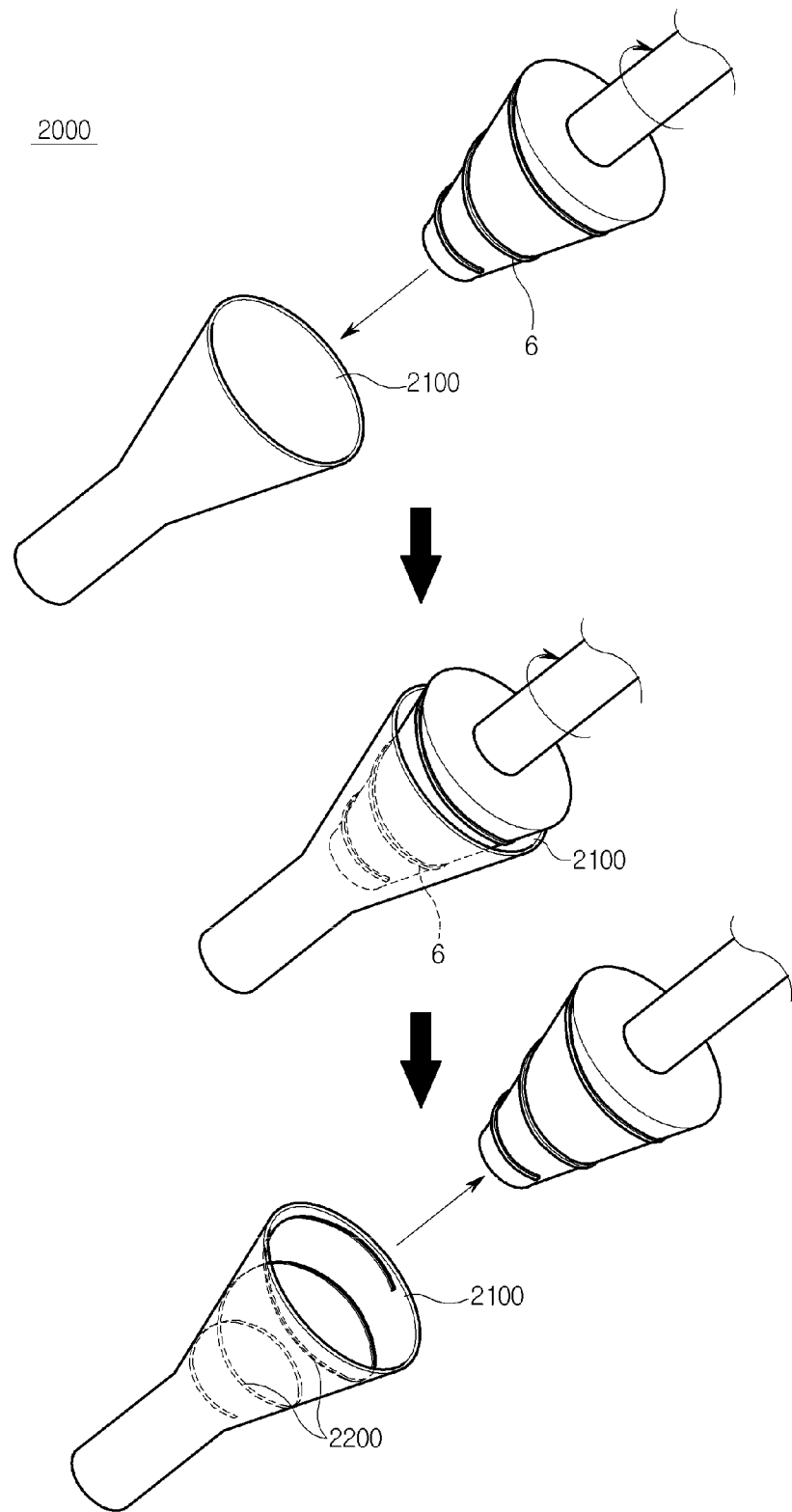

[FIG. 26]
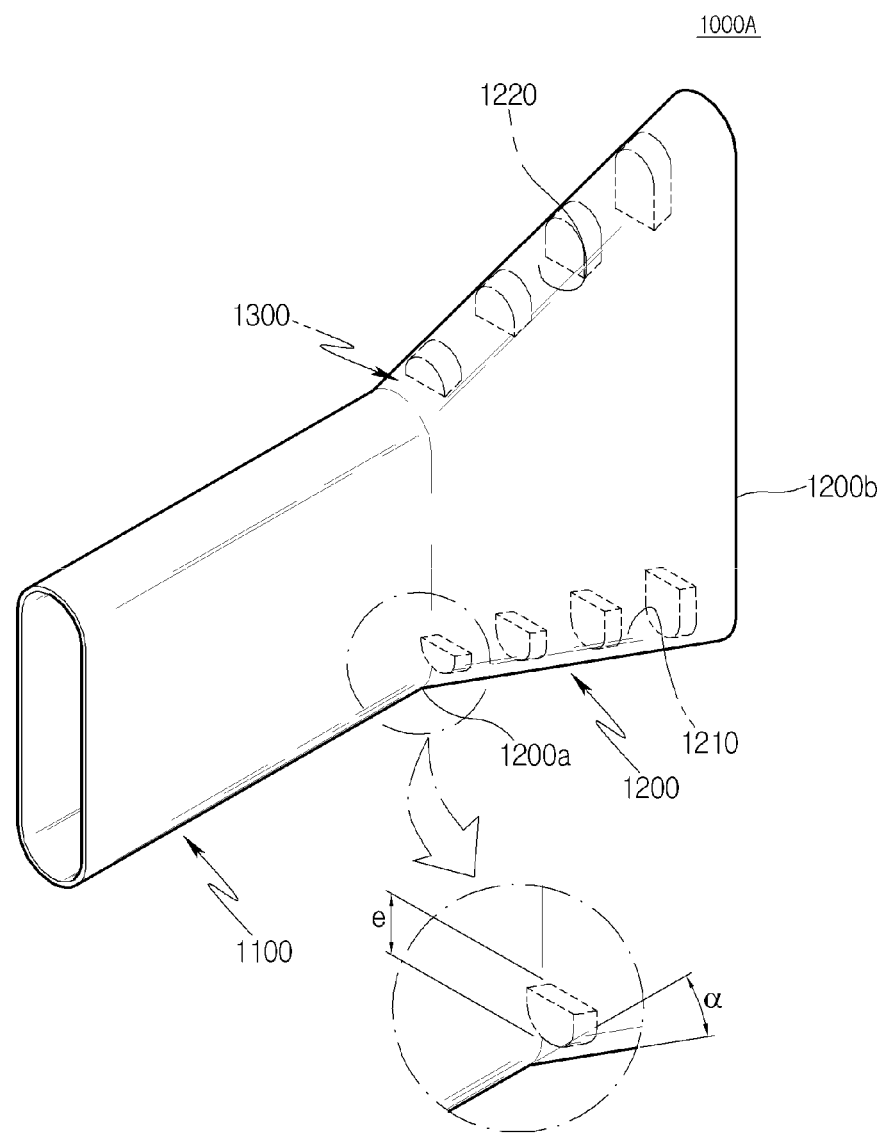

GAS TURBINE BLADE

CROSS-REFERENCE TO RELATED APPLICATIONS

This application is a national stage of International Application No. PCT/KR2017/009154, filed 22 Aug. 2017, which claims the benefit of priority to Korean Application(s) No. 10-2016-0106339, filed 22 Aug. 2016 and No. 10-2017-0106069, filed 22 Aug. 2017 in the Korean Intellectual Property Office, the disclosures of which are incorporated herein by reference.

TECHNICAL FIELD

The present disclosure relates to a turbine blade included in a turbine, and more particularly, to a gas turbine blade in which film cooling is performed on a turbine blade coming into contact with hot gas flowing thereto.

BACKGROUND ART

In general, a gas turbine is a type of internal combustion engine that converts thermal energy into mechanical energy in such a way to rotate a turbine by injecting high-temperature and high-pressure combustion gas, which is produced by burning a mixture of fuel with air compressed at high pressure in a compressor, into the turbine.

For this turbine, a structure has been widely used in which a plurality of turbine rotor disks, each having a plurality of turbine blades arranged on the outer peripheral surface thereof, is configured in a multistage manner so that high-temperature and high-pressure combustion gas passes through the turbine blades.

Film cooling is typically used to cool the surface of each of the turbine blades of the turbine, and description thereof will be given with reference to the accompanying drawing.

Referring to FIG. 1, for cooling a turbine blade from hot gas supplied to the surface thereof, the turbine blade has a plurality of film cooling elements 7 formed on the surface thereof.

Each of the film cooling elements 7 includes an inlet 7a that has a circular shape for introduction of cooling air supplied from the inside of the turbine blade, and an expansion portion 7b that has bilateral symmetry while expanding outward from the extended end of the inlet 7a.

Since the inlet 7a is circular in cross-section when viewed from the front, the expansion portion 7b extends at a specific divergence angle α to supply a large amount of cooling air to the surface of the turbine blade. Non-uniform separation occurs in the extension portion 2b as the divergence angle α increases.

In this case, the cooling effect on the surface of the turbine blade may be reduced because cooling air is non-uniformly injected on the surface of the turbine blade.

In addition, a hoop stress occurs due to the circular cross-section of the inlet 7a, resulting in deformation or cracks due to stress concentration at a specific position.

DISCLOSURE

Technical Problem

Exemplary embodiments of the present disclosure are to provide a gas turbine blade in which a plurality of turbine blades can be stably cooled and cooling efficiency thereof can be enhanced by changing the shape of each film cooling element provided in the turbine blades to an elliptical shape.

Technical Solution

In accordance with a first aspect of the present disclosure, a gas turbine blade includes a turbine blade (33) provided in a turbine, and film cooling elements (100), each including a cooling channel (110) for cooling of the turbine blade (33), an outlet (120) through which cooling air is discharged, and a plurality of ribs (130), wherein the outlet (120) extends from a longitudinally extended end of the cooling channel (110) to an outer surface of the turbine blade (33) and has a width increased from one end of the cooling channel (110) to the outer surface of the turbine blade (33), and the ribs (130) face each other on inner walls of the outlet (120).

The cooling channel (110) may have a cylindrical shape and extend toward the outlet (120), and the outlet (120) may have a divergence angle ($\alpha$) and expand elliptically outward from a rear end of the cooling channel (110).

The divergence angle ($\alpha$) may be equal to or greater than 15°.

The divergence angle ($\alpha$) may be from 15° to 40°.

The film cooling elements (100) may be disposed on each of a pressure side (33a) and a suction side (33b) of the turbine blade (33).

The film cooling elements (100) may be arranged at different intervals in a section from a leading edge (34) to a trailing edge (35) of the turbine blade (33) to realize film cooling.

The film cooling elements (100) may be provided in each of first- and second-stage turbine blades of a plurality of unit turbine blades constituting the turbine blade (33).

The cooling channel (110) may have a length four to eight times its diameter (D).

The diameter (D) may be 0.6 mm to 1.0 mm.

The outlet (120) may have an angle of inclination ($\alpha$) of 30° to 40° that is formed by its longitudinal center line and the surface of the turbine blade (33).

The outlet (120) may be expanded at an angle of 15° to 20° in both lateral directions from the cooling channel (110).

The ribs (130) may have the same protruding length (e) in the outlet (120).

The ribs (130) may have a protruding length (e) gradually increased from one end of the cooling channel (110) to the outer surface of the turbine blade (33).

When the total length from a front end of the outlet (120) to its rear end extending to the outer surface of the turbine blade (33) is defined as "L", the ribs (130) may be arranged to the rear end from a position spaced from the front end by ⅕×L.

Each of the ribs (130) may have a polypyramid shape.

Each of the ribs (130) may have an opening hole (140) formed therein for introduction of cooling air.

The opening hole (140) may be open toward an associated one of the inner walls of the outlet (120).

The opening hole (140) may have a diameter reduced from the front to the back of the rib (130).

The opening hole (140) may have a transverse elliptical shape when viewed from the front of the rib (130), or have a vertical elliptical shape when viewed from the front of the rib (130) and be adjacent to an associated one of the inner walls of the outlet (120).

The gas turbine blade may further include first film cooling elements (102) formed in a leading edge (34) of the turbine blade (33), in addition to the film cooling elements (100).

Each of the first film cooling elements (102) may include a first cooling channel (102a) through which cooling air passes, a first outlet (102b) extending from a longitudinally extended end of the first cooling channel (102a) to the outer surface of the turbine blade (33), and first ribs (130a) arranged on inner walls of the first outlet (102b) and guiding the cooling air to flow toward the first outlet (102b) in a vortex form.

The first outlet (102b) may have a longitudinal length greater than the first cooling channel (102a).

The first ribs (130a) may be arranged to face each other and each have a C-ring shape.

When the length of each of the first ribs (130a) protruding inward of the first outlet (102b) is defined as a protruding length (e) and the distance between centers of the spaced first ribs (130a) is defined as a separation pitch (p), the p/e may be 5 mm to 10 mm.

The first ribs (130a) may be arranged longitudinally in an alternate manner on the inner walls of the first outlet (102b).

The first ribs (130a) may be arranged longitudinally in a spiral form on the inner walls of the first outlet (102b).

When the total section of the first outlet (102b) is defined as an extension section (S), the section of the first outlet (102b) to ½×S from a position connected to the first cooling channel (102a) is defined as a first extension section (S1), and the remaining section of the first outlet (102b) is defined as a second extension section (S2) in the first film cooling element (102), a distance between first ribs (130a) arranged in the first extension section (S1) may differ from a distance between first ribs (130a) arranged in the second extension section (S2).

A separation pitch (p) between centers of the first ribs (130a) arranged in the first extension section (S1) may be shorter than that between centers of the first ribs (130a) arranged in the second extension section (S2).

In the present disclosure, there is provided a gas turbine in which the film cooling elements (100) according to the first aspect are provided in the turbine blade (33).

In accordance with a second aspect of the present disclosure, a gas turbine blade includes a turbine blade (330) provided in a turbine, first film cooling elements (1020) provided in a leading edge (340) for cooling of the turbine blade (330), and second film cooling elements (1000) provided in a pressure side (330a) and a suction side (330b) of the turbine blade (330).

Each of the first film cooling elements (1020) may include a first cooling channel (1020a) through which cooling air passes, a first outlet (1020b) extending from a longitudinally extended end of the first cooling channel (1020a) to an outer surface of the turbine blade (330) and having a width increased from one end of the first cooling channel (1020a) to the outer surface of the turbine blade (330), and first ribs (1300a) arranged to face each other on inner walls of the first outlet (1020b) and guiding the cooling air to flow toward the first outlet (1020b) in a vortex form.

The first cooling channel (1020a) may have a cylindrical shape and extend toward the first outlet (1020b), and the first outlet (1020b) may have a divergence angle (α) and expand elliptically outward from a rear end of the first cooling channel (1020a).

The divergence angle (α) may be from 15° to 40°.

The first outlet (1020b) may have a longitudinal length greater than the first cooling channel (1020a).

The first ribs (1300a) may be arranged to face each other and each have a C-ring shape.

When the length of each of the first ribs (1300a) protruding inward of the first outlet (1020b) is defined as a protruding length (e) and the distance between centers of the spaced first ribs (1300a) is defined as a separation pitch (p), the p/e may be 5 mm to 10 mm.

The first ribs (1300a) may be arranged longitudinally in a spiral form on the inner walls of the first outlet (1020b).

Each of the second film cooling elements (1000) may include a second cooling channel (1100) through which cooling air passes, a second outlet (1200) extending from a longitudinally extended end of the second cooling channel (1100) to an outer surface of the turbine blade (330) and having a width increased from one end of the second cooling channel (1100) to the outer surface of the turbine blade (330), and a plurality of second ribs (1300) arranged to face each other on inner walls of the second outlet (1200).

The second cooling channel (1100) may have a cylindrical shape and extend toward the second outlet (1200), and the second outlet (1200) may have a divergence angle (α) and expand elliptically outward from a rear end of the second cooling channel (1100).

The divergence angle (α) may be from 15° to 40°.

The first and second film cooling elements (1020 and 1000) may be provided in each of first- and second-stage turbine blades of a plurality of unit turbine blades constituting the turbine blade (330).

The second cooling channel (1100) may have a length four to eight times its diameter (D).

The diameter (D) may be 0.6 mm to 1.0 mm.

The second outlet (1200) may have an angle of inclination (α) of 30° to 40° that is formed by its longitudinal center line and the surface of the turbine blade (330).

The second outlet (1200) may be expanded at an angle of 15° to 20° in both lateral directions from the second cooling channel (1100).

In the present disclosure, there is provided a gas turbine in which the first and second film cooling elements (1020 and 1000) according to the second aspect are provided in the turbine blade (330).

In accordance with a third aspect of the present disclosure, a gas turbine blade includes a turbine blade (330) provided in a turbine, film cooling elements (1000A) provided in a pressure side (330a) and a suction side (330b) of the turbine blade (330), and leading edge cooling elements (2000), each having an opening (2100), which is open at a leading edge (340), and protrusions (2200) arranged in a spiral form in the opening (2100) to guide cooling air in a vortex form for cooling of the turbine blade (330), wherein the openings (2100) of the leading edge cooling elements (2000) are open at different positions and in different directions according to temperature distribution of the leading edge (340).

The opening (2100) of each of the leading edge cooling elements (2000) may have one of cylindrical, elliptical, and trapezoidal shapes.

Each of the film cooling elements (1000A) may include a cooling channel (1100) through which cooling air passes, an outlet (1200) extending from a longitudinally extended end of the cooling channel (1100) to an outer surface of the turbine blade (330) and having a width increased from one end of the cooling channel (1100) to the outer surface of the turbine blade (330), and a plurality of ribs (1300) arranged to face each other on inner walls of the outlet (1200).

The cooling channel (1100) may have a cylindrical shape and extend toward the outlet (1200), the outlet (1200) may have divergence angle (α) and expand elliptically outward from a rear end of the cooling channel (1100), and the divergence angle (α) may be 15°.

Advantageous Effects

According to exemplary embodiments of the present disclosure, it is possible to minimize a separation phenomenon by a plurality of ribs formed in an outlet and supply cooling air, the flow of which is stable, to the surface of a turbine blade.

According to exemplary embodiments of the present disclosure, it is possible to improve heat transfer performance by making the most of the limited region of a film cooling element and thus enhance cooling efficiency on the surface of the turbine blade.

According to exemplary embodiments of the present disclosure, it is possible to minimize separation or a non-uniform flow in the film cooling element to improve the flow stability of cooling air.

BRIEF DESCRIPTION OF DRAWINGS

FIG. 1 is a view illustrating a film cooling element formed in a conventional turbine blade.

FIG. 2 is a longitudinal cross-sectional view illustrating a gas turbine equipped with turbine blades according to the present disclosure.

FIG. 3 is an enlarged perspective view illustrating a gas turbine blade and film cooling elements according to a first embodiment of the present disclosure.

FIG. 4 is a perspective view illustrating another example of ribs included in each film cooling element according to the first embodiment of the present disclosure.

FIGS. 5 and 6 are views illustrating a flow of cooling air through the ribs included in the film cooling element according to the first embodiment of the present disclosure.

FIGS. 7 and 8 are views illustrating a detail of a film cooling element according to the present disclosure.

FIGS. 9 and 10 are views illustrating various examples of ribs according to the first embodiment of the present disclosure.

FIGS. 11 to 15 are views illustrating various shapes of opening holes formed in ribs according to the first embodiment of the present disclosure.

FIGS. 16 to 18 are views illustrating first film cooling elements according to the first embodiment of the present disclosure.

FIG. 19 is a view illustrating another example of first film cooling elements according to the first embodiment of the present disclosure.

FIGS. 20 and 21 are side views illustrating first ribs included in each first film cooling element according to the first embodiment of the present disclosure.

FIG. 22 is a view illustrating another example of first ribs included in the first film cooling element according to the first embodiment of the present disclosure.

FIG. 23 is a view illustrating a gas turbine blade according to a second embodiment of the present disclosure.

FIG. 24 is a perspective view illustrating a gas turbine blade according to a third embodiment of the present disclosure.

FIG. 25 is a view illustrating a state in which a leading edge cooling element is machined with the use of a tool according to the third embodiment of the present disclosure.

FIG. 26 is a perspective view illustrating a film cooling element according to the third embodiment of the present disclosure.

BEST MODE FOR INVENTION

Prior to description of embodiments of the present disclosure, a configuration of a gas turbine will be described with reference to the accompanying drawings.

Referring to FIG. 2, a gas turbine includes a casing 10 that defines an external appearance thereof, and a diffuser that is disposed behind the casing 10 (to the right in FIG. 2) to discharge combustion gas having passed through a turbine.

The gas turbine includes a combustor 11 that is disposed in front of the diffuser to be supplied with compressed air for combustion.

In the flow direction of air, a compressor 12 is disposed in the front of the casing 10 and a turbine 30 is disposed in the rear of the casing 10.

A torque tube 14 is disposed between the compressor 12 and the turbine 30 to transmit a rotational torque generated in the turbine 30 to the compressor 12.

The compressor 12 includes a plurality of compressor rotor disks (e.g., 14 disks) fastened so as not to be axially separated from each other by a tie rod 15.

The compressor rotor disks are axially aligned in the state in which the tie rod 15 passes through their centers. A flange protrudes axially in the vicinity of the outer peripheral portion of each of the compressor rotor disks in such a manner that it is coupled to an adjacent rotor disk so as not to be rotatable relative thereto.

Each of the compressor rotor disks has a plurality of compressor blades radially coupled to the outer peripheral surface thereof. Each of the compressor blades has a dovetail to be fastened to the compressor rotor disk.

The fastening method of the dovetail is of a tangential type or an axial type. This type may be selected according to the required structure of the commercial gas turbine. In some cases, the compressor blade may be fastened to the compressor rotor disk using a fastener other than the dovetail.

The tie rod 15 is disposed to pass through the centers of the plurality of compressor rotor disks. One end of the tie rod 15 is fastened to a compressor rotor disk positioned at the most upstream side, and the other end thereof is fixed into the torque tube.

The tie rod may have various shapes according to the structure of the gas turbine, and it is therefore not limited to having a shape illustrated in the drawings.

For example, one tie rod may be formed to pass through the centers of compressor rotor disks, a plurality of tie rods may be arranged circumferentially, or a combination thereof may be used.

Although not illustrated in the drawings, a vane, which serves as a guide vane in the following position of the diffuser and is called a desworler, may be installed in the compressor of the gas turbine to adjust the flow angle of a fluid, entering the inlet of the combustor after the pressure of the fluid increases, to a design flow angle.

The combustor 11 mixes the compressed air introduced thereinto with fuel for combustion to produce high-temperature and high-pressure combustion gas with high energy, and increases the temperature of the combustion gas to a temperature at which the combustor and turbine components are able to be resistant to heat in a constant-pressure combustion process.

The constituent combustor of the combustion system of the gas turbine may consist of a plurality of combustors arranged in a shell form in the casing, and includes a burner that has a fuel injection nozzle or the like, a combustor liner that forms a combustion chamber, and a transition piece that is a connection between the combustor and the turbine.

In detail, the liner defines a combustion space in which fuel injected from the fuel nozzle is mixed with the compressed air from the compressor for combustion. The liner may include a flame container that defines the combustion space for burning a mixture of fuel and air, and a flow sleeve that defines an annular space while surrounding the flame container.

The fuel nozzle is coupled to the front end of the liner, and an ignition plug is coupled to the side wall of the liner.

The transition piece is connected to the rear end of the liner to send the combustion gas burned by the ignition plug to the turbine.

The transition piece is configured such that the outer wall thereof is cooled by the compressed air supplied from the compressor so as to prevent damage of the transition piece due to the high temperature of the combustion gas.

To this end, the transition piece has cooling holes formed for injection of air thereinto, and the compressed air is introduced through the holes into the transition piece to cool a main body therein and then flows to the liner.

The cooling air used to cool the transition piece may flow in the annular space of the liner, and may impinge on compressed air as cooling air supplied through cooling hole, formed in the flow sleeve, from the outside of the flow sleeve in the outer wall of the liner.

In the turbine, the high-temperature and high-pressure combustion gas discharged from the combustor gives impulsive or reaction force to the rotor blades of the turbine while expanding to generate mechanical energy.

Some of the mechanical energy obtained in the turbine is provided as energy required for compression of air in the compressor, and the remainder is used to produce electric power for driving a generator.

The turbine includes a plurality of stators and rotors alternately arranged therein, and the rotors are driven by combustion gas to rotate an output shaft connected to the generator.

To this end, the turbine 30 includes a plurality of turbine rotor disks. Fundamentally, each of the turbine rotor disks has a structure similar to the compressor rotor disk.

Each of the turbine rotor disks also has a flange coupled to an adjacent turbine rotor disk, and includes a plurality of turbine blades 33 (see FIG. 3) arranged radially. Each of the turbine blades 33 may be coupled to the turbine rotor disk in a dovetail manner as well.

In the gas turbine having the above structure, after air introduced thereinto is compressed in the compressor 12 and is used for combustion in the combustor 11, it flows to the turbine 30 to drive the turbine and is then discharged to the atmosphere through the diffuser.

A representative method of enhancing the efficiency of the gas turbine is to increase the temperature of gas introduced into the turbine 30, in which case, however, the inlet temperature of the turbine 30 may be increased.

In addition, the turbine blade 33 included in the turbine 30 may be problematic, and a thermal stress may occur in the turbine blade 33 due to a local increase in the temperature thereof. If this thermal stress continues for a long time, it may lead to breakage of the turbine blade 33 due to creep.

To compensate the above issues of the turbine blade 33, cooling air is supplied into the turbine blade 33. The cooling air serves to cool the turbine blade 33 while flowing along the passage formed therein, and description thereof will be given below.

Hereinafter, a gas turbine blade according to a first embodiment of the present disclosure will be described with reference to the accompanying drawings.

Referring to FIGS. 2 to 4, in the gas turbine blade according to the first embodiment of the present disclosure, the outer peripheral surface of a turbine blade 33 needs to be stably cooled when hot gas is supplied thereto.

Accordingly, the present disclosure is aimed at performing film cooling on the surface of the turbine blade 33 through film cooling elements 100 that enable cooling air supplied into the turbine blade 33 to the outer peripheral surface of the turbine blade 33.

To this end, the present disclosure includes a plurality of film cooling elements 100 formed in the section from a leading edge 34 to a trailing edge 35 of the turbine blade 33. The film cooling elements 100 are provided to realize film cooling in such a manner that cooling air is supplied into the turbine blade 33 and then injected onto the surface thereof.

Each of the film cooling elements 100 includes a cooling channel 110 through which cooling air passes, an outlet 120 that extends from the longitudinally extended end of the cooling channel 110 to the outer surface of the turbine blade 33 and has a width increased from one end of the cooling channel 110 to the outer surface of the turbine blade 33, and a plurality of ribs 130 facing each other on the inner walls of the outlet 120.

For reference, the outlet 120 has inner walls 121 and 122 formed to face each other therein, and the ribs 130 are arranged on the inner walls 121 and 122 as illustrated in the drawings.

The film cooling element 100 performs film cooling on the surface of the turbine blade 33 coming into contact with hot gas flowing along the outer peripheral surface thereof.

In the film cooling element 100, film cooling is realized by exchanging heat on the surface of the turbine blade 33 when cooling air is supplied through the outlet 120 and reducing the high temperature of hot gas to a predetermined temperature while cooling air is stably dispersed toward the surface of the turbine blade 33.

Especially, the film cooling element 100 is advantageous to uniformly maintain cooling efficiency since it can minimize a non-uniform flow due to separation in the internal region of the outlet 120 when cooling air flows to the outer peripheral surface of the turbine blade 33 through the outlet 120.

Since the present disclosure includes the ribs 130 on the inner walls 121 and 122 to maintain a uniform flow of cooling air in the outlet 120, it is possible to minimize an unstable flow due to separation and simultaneously enhance the flow stability of cooling air.

The plurality of ribs 130 are arranged at regular intervals toward the outer peripheral surface as the outer surface of the turbine blade 33 along the inner walls of the outlet 120. For example, the number of ribs 130 is equal to that illustrated in the drawings and the ribs 130 face each other on the inner walls 121 and 122.

When the length of each rib 130 protruding inward (i.e., to the center of the outlet) on each of the inner walls 121 and 122 is defined as a protruding length e, the distance between one rib 130 and another rib 130 may be equal to or greater than 5e.

The protruding length e of each rib 130 and the distance between the ribs 130 affect heat transfer performance. Accordingly, the distance between the ribs 130 is set as the above distance since it is advantageous that the distance between the ribs 130 is equal to or greater than 5e rather than less than 5e to transfer a larger amount of heat for cooling.

For reference, since the protruding length e of each rib 130 varies depending on the size of the outlet 120, it is set through separate analysis or simulation.

When the total length from a front end 120a to a rear end 120b of the outlet 120 is defined as "L", the plurality of ribs 130 are arranged to the rear end 120b from a position spaced from the front end 120a by ⅓×L.

In the outlet 120, a flow of cooling air is kept uniform in the front end 120a compared to the rear end 120b and separation begins around a position spaced toward the rear end from the front end 120a by ⅕×L. Therefore, it is possible to minimize an unstable flow due to the separation when the ribs 130 are arranged from the position.

Referring to FIG. 4, in the present embodiment, the ribs 130 have the same protruding length e in the outlet 120 or the protruding lengths e of the ribs 130 may increase toward the transverse center of the outlet 120 from the front end 120a to the rear end 120b of the outlet 120.

In the latter case, the area of the rear end 120b increases and a flow in the transverse center of the outlet 120 may be unstable compared to that in the front end 120a. Therefore, it is possible to guide a stable flow of cooling air by increasing the protruding lengths e of the ribs 130.

One end of the cooling channel 110 is connected to the inside of the turbine blade 33 for introduction of cooling air, and the other end thereof extends outward of the turbine blade 33 and has a circular cross-section but may have an elliptical shape.

In the present embodiment, the outlet 120 has a divergence angle α and expands elliptically in the transverse direction thereof from the rear end of the cooling channel 110.

The cooling channel 110 has a cylindrical shape and extends toward the outlet 120, and the divergence angle α is equal to or greater than 15°.

The divergence angle α is set as the above angle in order to suppress an occurrence of separation and guide a stable flow before cooling air is supplied to the surface of the turbine blade 33 through the outlet 120.

In the present embodiment, it is possible to cause a film cooling effect since a flow of cooling air is stably and optimally guided in the cooling channel 110 in the range in which the divergence angle α is from 15° to 40°.

In the present embodiment, it is possible to reduce separation occurring while cooling air flows and guide a uniform flow of cooling air flowing along the center of the outlet 120 by the ribs 130 together with the divergence angle.

In the drawings, the ribs 130 are arranged on each of the inner walls 121 and 122 and are symmetrical about the transverse center of the outlet 120. The flow rate of cooling air may be reduced on the inner walls 121 and 122 when the cooling air flows along the internal region of the outlet 120, thereby causing a separation phenomenon. Therefore, the plurality of ribs 130 are arranged on the inner walls.

When cooling air flows along the cooling channel 110 with a constant diameter and then flows to the outlet 120 in the internal region of the outlet 120, separation may occur on the inner walls 121 and 122.

It is most preferable that cooling air uniformly flow in the internal region of the outlet 120, but the flow rate of cooling air is close to "0" (zero) on the inner walls 121 and 122 of the outlet 120. Thus, the flow rate and viscosity of cooling air flowing on the inner walls 121 and 122 differ from those of cooling air flowing along the transverse center of the outlet.

A separation phenomenon may occur due to the different flow rates of cooling air because the cooling air flowing along the transverse center does not rectilinearly flow forward in the internal region of the outlet 120 but flows at a relatively low velocity toward the inner walls 121 and 122. Accordingly, the present disclosure includes the ribs 130 to minimize this separation phenomenon.

Referring to FIG. 3 or FIGS. 5 and 6, in order to minimize the separation occurring in the internal region of the outlet 120, the present disclosure causes an eddy phenomenon in which a small vortex is formed when cooling air flow through the ribs 130 installed on the inner walls 121 and 122.

The eddy phenomenon enables cooling air to stably flow by preventing the unnecessary separation of the cooling air flowing along the inner walls 121 and 122 of the outlet 120.

In addition, it is possible to enhance the overall cooling performance of the turbine blade 33 by improving heat transfer performance when cooling air is supplied to the surface of the turbine blade 33 through the outlet 120.

For example, the flow of cooling air to the surface of the turbine blade 33 along the internal region of the outlet 120 is tested through SolidWorks Flow Simulation (which is called "CFD"), and the result thereof is shown as illustrated in the drawings.

Unlike the separation phenomenon in which a significantly large vortex is formed in cooling air, a small vortex is formed in cooling air on the inner walls 121 and 122 in the eddy phenomenon. This small vortex does not affect the overall flow of cooling air but it guides the flow direction of cooling air to the transverse center of the outlet 120 on the inner walls 121 and 122, as illustrated in the drawings.

It can be especially seen that the vortex of cooling air is small around each of the ribs 130 and the extent of the vortex becomes weak between the spaced ribs 130.

In the present embodiment, the plurality of ribs 130 are formed on the inner walls 121 and 122 for utilization of the eddy phenomenon. Thus, it is possible to minimize a separation phenomenon, which may unnecessarily occur due to a specific divergence angle, by guiding a uniform flow of cooling air in the transverse center of the outlet 120, thereby ensuring that the flow of the cooling air is stably guided.

In addition, it is possible to simultaneously improve heat transfer performance while cooling air uniformly flows to the surface of the turbine blade 33 through the outlet 120.

The film cooling elements 100 are disposed at different positions of each of a pressure side 33a and a suction side 33b of the turbine blade 33, and these positions correspond to positions at which hot gas flows along the surface of the turbine blade 33.

A film cooling effect is stably maintained on the pressure side 33a and the suction side 33b while cooling air flows along the surface of the turbine blade 33 as indicated by the arrow, with the consequence that the film cooling of the turbine blade 33 can be realized.

By way of example, for the realization of film cooling in the present embodiment, the film cooling elements 100 may be arranged at different intervals in the section from the leading edge 34 to the trailing edge 35 of the turbine blade 33.

For the film cooling elements 100 arranged on the pressure side 33a and suction side 33b of the turbine blade 33, a large number of film cooling elements may be intensively arranged in a high-temperature section and a small number of film cooling elements may be arranged in a relatively low-temperature section.

The film cooling elements 100 are provided in each of first- and second-stage turbine blades of a plurality of unit turbine blades constituting the turbine blade 33. The first- and second-stage turbine blades correspond to parts with which the hot gas having passed through the combustor comes into direct or indirect contact.

In this case, a cooling effect may vary depending on the flow trajectory and temperature distribution of hot gas flowing along the pressure side 33a and the suction side 33b. However, in the present embodiment, a film cooling effect on the surface of the turbine blade 33 can be improved, for example, by configuring the layout or distribution of the film cooling elements in a different manner on the pressure side 33a and the suction side 33b.

Thus, since the film cooling effect on the surface of the turbine blade 33, which comes into contact with hot gas, is improved, it is possible to prevent the deformation of the turbine blade even though it is used for a long time.

Referring to FIGS. 7 and 8, each of the film cooling elements 100 largely includes a cooling channel 110 and an outlet 120, and the cooling channel 110 may have a length four to eight times the diameter D thereof.

The diameter D is, but not limited to, for example, 0.6 mm to 1.0 mm, and may be changed in various manners depending on the specification of the gas turbine.

A maximum film cooling effect can be obtained on a turbine blade 33 when the diameter D of the cooling channel 110 is 0.6 mm and the length of the cooling channel 110 is 2.4 mm in an example, and a heat transfer effect can thus be stably maintained.

The cooling channel 110 may have a maximum length of 4.8 mm, but the present disclosure is not necessarily limited thereto when the cooling channel 110 has a length four to eight times the diameter D thereof.

The outlet 120 has an angle of inclination $\alpha$ of 30° to 40°, which is formed by the longitudinal center line of the outlet 120 and the surface of the turbine blade 33.

If the angle of inclination $\alpha$ is less than 30°, the cooling channel 110 may be unnecessarily elongated. If the angle of inclination $\alpha$ is greater than 40°, cooling air may not be injected onto the surface of the turbine blade 33 or only a portion of the cooling air may flow to the surface of the turbine blade 33. Accordingly, it is possible to cause a stable film cooling effect on the turbine blade 33 only when the angle of inclination $\alpha$ is set as the above angle.

The outlet 120 is expanded at an angle of inclination $\beta$ of 15° to 20° in both lateral directions from the cooling channel 110. The divergence angle, at which cooling air is injected onto the surface of the turbine blade 33, may be changed depending on the expanded angle of the outlet 120, and this angle is an angle that may optimally maintain the film cooling effect on the surface of the turbine blade 33.

Thus, the angle of the outlet 120 is set as an angle of 15° to 20° such that a maximum film cooling effect can be maintained by injecting cooling air onto the surface of the turbine blade 33 to realize effective cooling.

Referring to FIGS. 9 and 10, each rib 130 may be, for example, a polyhedron, the apex of which has an angle less than 90° and greater than 0°. The polyhedron is not limited to a specific polyhedron, but there is used a polyhedron in which a stable eddy phenomenon occurs through the CFD. That is, the rib 130 has a polypyramid shape.

In the case where the rib 130 has a polyhedral shape, heat transfer performance can be enhanced by an increase in contact area with cooling air.

The rib may be, for example, a rectangular parallelepiped, the apex of which has an angle of 90°. The reason the apex is formed at the above angle is because it is advantageous rather than being circular or round when it is intended to form a small vortex in cooling air.

Referring to FIG. 11, the turbine blade includes the plurality of ribs 130 spaced apart from each other on each of the inner walls 121 and 122 facing each other in the outlet 120, wherein each of the ribs 130 has an opening hole 140 that is open at the front thereof for supply of cooling air thereto.

In the present embodiment, the opening hole 140 is formed in the rib 130 to guide the flow direction of cooling air and realize a stable flow of cooling air and an improvement in heat transfer performance at the same time.

In the present embodiment, the opening holes 140 of the ribs 130 are open toward the associated inner walls 121 and 122 of the outlet 120. For reference, each of the opening holes 140 may have an optimally sized area through separate simulation or flow analysis.

Since the opening holes 140 are open toward the inner walls 121 and 122, a certain amount of cooling air may be supplied to the inner walls 121 and 122, in which case it is possible to improve heat transfer efficiency by the cooling air supplied to the inner walls 121 and 122.

When cooling air flows to the inner walls 121 and 122, the cooling air flows to the ribs 130, after heat transfer is performed while the cooling air is circulated in the region between the spaced ribs 130, and is mixed with small vortices formed in the ribs 130.

An eddy phenomenon in which a small vortex is formed occurs when cooling air flow to the ribs 130 through the cooling channel 110. Unlike the separation phenomenon in which a significantly large vortex is formed in cooling air, a small vortex is formed in cooling air on the inner walls 121 and 122 in the eddy phenomenon. This small vortex does not affect the overall flow of cooling air but it guides the flow direction of cooling air to the transverse center of the outlet 120 on the inner walls 121 and 122.

Especially, the vortex of cooling air is small around each of the ribs 130 and the extent of the vortex becomes weak between the spaced ribs 130.

In the present embodiment, the plurality of ribs 130 are formed on the inner walls 121 and 122 for utilization of the eddy phenomenon. Thus, it is possible to minimize a separation phenomenon, which may unnecessarily occur due to a specific divergence angle, by guiding a uniform flow of cooling air in the transverse center of the outlet 120, thereby ensuring that the flow of the cooling air is stably guided.

Accordingly, after the small vortex occurring in each of the ribs 130 is mixed with the cooling air having passed through the opening holes 140, it uniformly flows to the turbine blade along the transverse center of the outlet 120.

In the present embodiment, each of the opening holes 140 has a constant diameter from the front to the back of the associated rib 130. In this case, an amount of air flowing to the inner walls 121 and 122 is uniformly maintained.

Referring to FIG. 12, each opening hole 140 may have an increasing area as it is close to the rear end 120b of the outlet 120 in an example. In this case, the opening hole 140 is disposed such that a portion of the opening hole 140, from which cooling air is discharged, is directed toward the associated inner wall 121 or 122.

Since cooling air flows to the inner walls 121 and 122 in a dispersed form, a larger amount cooling air flows toward the inner walls 121 and 122 through the opening hole 140 compared to an opening hole having a constant size. Therefore, it is possible to improve heat transfer efficiency on the inner walls 121 and 122 and enhance the cooling performance of the turbine blade.

Referring to FIG. 13, each opening hole 140 may have a transverse elliptical shape when viewed from the front of an associated rib 130 in an example. In the case where the opening hole 140 has an elliptical shape, a large amount of cooling air may be supplied to the inner walls 121 and 122 by making the most of the limited height of the film cooling element 100 for an improvement in heat transfer efficiency.

In one rib, one opening hole 140 or a plurality of opening holes 140 may be formed and the size thereof is not particularly limited.

Referring to FIG. 14, each opening hole 140 may have a vertical elliptical shape when viewed from the front of an associated rib 130 and be adjacent to the associated inner wall 121 or 122 of the outlet 120 in an example. In this case, a plurality of opening holes 140 may be formed in one rib and the rib has an increased opening area. Therefore, cooling air may be stably supplied to the inner walls 121 and 122.

In the case where the opening hole 140 is open in the vertical direction of the rib 130, it is possible to improve heat transfer efficiency since the flow direction of cooling air is guided toward the inner walls 121 and 122.

Referring to FIG. 15, each opening hole 140 has a diameter reduced from the front to the back of an associated rib 130 in an example. In this case, cooling air flows to a space between spaced ribs 130 in the state in which the flow rate of cooling air is increased while the cooling air passes through the opening hole 140.

The cooling air at this position flows to the ribs 130 at a higher velocity than that of cooling air flowing in the transverse center of the outlet 120. Then, the cooling air is mixed with small vortices formed in the ribs 130 and then stably flows to the rear end 120b of the outlet 120.

In the case where cooling air flows as described above, the cooling air is mixed with vortices formed in the vicinity of the protruding ribs 130, without staying after heat exchange with the inner walls 121 and 122, and then flows to the outlet 120.

Referring to FIGS. 16 and 17, the gas turbine blade further includes first film cooling elements 102 formed in the leading edge 34 of the turbine blade 33, in addition to the film cooling elements 100. The first film cooling elements 102 have a partially identical configuration to the above-mentioned film cooling elements 100, but they differ therefrom in detail.

Each of the first film cooling elements 102 includes a first cooling channel 102a through which cooling air passes, a first outlet 102b that extends from the longitudinally extended end of the first cooling channel 102a to the outer surface of the turbine blade 33, and a plurality of first ribs 130a arranged on the inner walls of the first outlet 102b and guiding the cooling air to flow toward the first outlet 102b in a vortex form.

For reference, the first outlet 102b has inner walls 102c and 102d formed to face each other therein, and the first ribs 130a are arranged on the inner walls 102c and 102d as illustrated in the drawings.

The first film cooling element 102 is formed in the leading edge 34 of the outer peripheral surfaces of the turbine blade 33 to perform film cooling on the surface of the leading edge 34 coming into contact with hot gas.

In the first film cooling element 102, film cooling is realized by exchanging heat on the surface of the leading edge 34 of the turbine blade 33 when cooling air is supplied through the first outlet 102b and reducing the high temperature of hot gas to a predetermined temperature while cooling air is stably dispersed toward the surface of the leading edge 34 of the turbine blade 33.

The first film cooling element 102 is advantageous to uniformly maintain cooling efficiency since it can minimize a non-uniform flow due to separation in the internal region of the first outlet 102b when cooling air flows to the leading edge 34 of the turbine blade 33 through the first outlet 102b.

Since the present disclosure includes the first ribs 130a on the inner walls 102c and 102d to maintain a uniform flow of cooling air in the first outlet 102b, it is possible to minimize an unstable flow due to separation and simultaneously enhance the flow stability of cooling air.

Unlike the above-mentioned ribs 130, the first ribs 130a are spirally arranged along the inner walls 102c and 102d of the first outlet 102b. This is to guide cooling air to spirally flow toward the surface of the turbine blade 33 in the first outlet 102b.

The first ribs 130a face each other and each have a C-ring shape. In the case where each of the first ribs 130a has a C-ring shape, a first flow occurs in which a portion of cooling air flows along the inner walls 102c and 102d, and a second flow occurs in which a portion of cooling air flows along the C-shaped first ribs 130a.

In this case, cooling air flows toward the turbine blade 33 in a spiral vortex form and is then injected onto the surface of the turbine blade 33. In this case, since the cooling air flows in the state in which it is in contact with the inner walls 102c and 102d of the first outlet 102b, an unstable flow due to separation is suppressed on the inner walls 102c and 102d.

In the present embodiment, the first ribs 130a may guide cooling air to flow in a spiral vortex form, and may change the flow of cooling air as illustrated in the drawings in the first outlet 102b in which the main flow of cooling air occurs. Therefore, it is possible to effectively realize the cooling of the leading edge 34 maintained at high temperature.

In particular, since the leading edge 34 corresponds to a portion coming into initial contact with hot gas, the film cooling of the leading edge 34 may be unstably performed or the surface temperature of the leading edge 34 may be rapidly increased due to hot gas.

If the surface temperature of the leading edge 34 is increased even though the pressure side 33a and the suction side 33b are stably cooled, the overall cooling efficiency of the turbine blade 33 may be reduced.

However, it is possible to improve the overall cooling performance of the turbine blade 33 by stably cooling the leading edge 34 and to stably cool the turbine blade 33 by guiding cooling air to spirally flow through the first film cooling elements 102 formed in the leading edge 34 for a reduction in separation in the present embodiment.

The first outlet 102b may have a longitudinal length greater than the first cooling channel 102a. This is because it is advantageous to increase the swirl of cooling air and maintain the spiral vortex flow thereof on the surface of the turbine blade 33.

For example, if the first outlet 102b has a shorter length than the first cooling channel 102a, it may be difficult to maintain the spiral vortex flow of cooling air.

To prevent this issue, the first outlet 102b has a greater length than the first cooling channel 102a, as illustrated in the drawings, in the present embodiment. Thus, the spiral swirl of cooling air stably occurs while the cooling air passes through the first ribs 130a.

Therefore, this spiral vortex flow can be maintained even when cooling air is injected onto the surface of the turbine blade 33.

The first ribs 130a face each other and each have a C-ring shape. This is because it is advantageous that the first rib 130a has a ring shape or a C shape to maintain the spiral vortex flow of cooling air.

The first rib 130a may have a ring shape or it may be preferable that the first rib 130a have a C shape illustrated in the drawings for easy machining when the first outlet 102b has a small internal region, but the present disclosure is not limited thereto.

For example, the first ribs 130a may have different shapes that enable the flow of cooling air to be easily changed to a spiral flow.

Referring to FIG. 16 or 18, the plurality of first ribs 130a are arranged at regular intervals along the inner walls 102c and 102d of the first outlet 102b. For example, the number of first ribs 130a is equal to that illustrated in the drawings and the first ribs 130a face each other on the inner walls 102c and 102d.

Each of the first ribs 130a protrudes inward (i.e., to the center of the first outlet) on each of the inner walls 102c and 102d and has a protruding length e. The first ribs 130a are spaced apart from each other by a separation pitch p.

When the length of each first rib 130a protruding inward of the first outlet 102b is defined as a protruding length e and the distance between the centers of the spaced first ribs 130a is defined as a separation pitch p in an example, the p/e may be 5 mm to 10 mm.

The p/e is preferably equal to or greater than at least 5 mm to guide the stable and spiral flow of cooling air. If the p/e is less than the above distance, the flow stability of cooling air may be degraded.

In the present example, the p/e is maximum 10 mm and is set to be the above range, considering that the protruding length e and the separation pitch p vary in various manners.

Referring to FIGS. 19 and 20, first ribs 130a may be arranged longitudinally in an alternate manner on the inner walls of the first outlet 102b in an example. In this case, it may be further advantageous to maintain the spiral flow of cooling air.

In the present example, the first ribs 130a may be arranged perpendicular to the first outlet 102b when viewed from the side.

Referring to FIG. 21, each first rib 130a may have a C shape and be inclined at a first angle of inclination θ1 when viewed from the side in another example. The reason the first rib 130a is inclined at the first angle of inclination θ1 is because cooling air comes into contact with the first rib 130a at a right angle when the flow direction of the cooling air is guided after the cooling air comes into initial contact with the first rib 130a.

In the present example, the first ribs 130a is inclined at the first angle of inclination θ1 to guide cooling air to come into contact with the first rib 130a at a right angle. In this case, it is possible to improve the swirl of cooling air since damage due to impact is reduced when, after cooling air comes into contact with the first rib 130a, a portion of the cooling air flows forward and a portion of the cooling air spirally flows.

Referring to FIG. 22, when the total section of the first outlet 102b is defined as an extension section S, the section of the first outlet 102b to ½×S from the position connected to the first cooling channel 102a is defined as a first extension section S1, and the remaining section of the first outlet 102b is defined as a second extension section S2, the first film cooling element 102 may be configured such that the distance between first ribs 130a arranged in the first extension section S1 differs from the distance between first ribs 130a arranged in the second extension section S2.

The first and second extension sections S1 and S2 are sections in which the swirl of cooling air occurs in a spiral form by the first ribs 130a when the cooling air is introduced thereinto, and the distances between the first ribs 130a are configured to differ from each other as described above in order to optimally adjust the distances between the first ribs 130a considering the length of the first outlet 102b.

For example, the separation pitch p between the first ribs 130a arranged in the first extension section S1 may be shorter than that between the first ribs 130a arranged in the second extension section S2.

In this case, the swirl of cooling air occurring while the cooling air introduced into the first outlet 102b passes through the first ribs 130a in the first extension section S1 is greater than that occurring in the second extension section S2.

In addition, it is sufficient that the swirl of cooling air is maintained such that cooling air may be stably injected onto the surface of the turbine blade 33 without reducing the swirl thereof in the second extension section S2. Therefore, it is possible to stably maintain the spiral vortex flow of cooling air even though the separation pitch p between the first ribs 130a arranged in the second extension section S2 is longer than that in the first extension section S1.

The film cooling element 100 may be formed by casting together when the turbine blade 33 is manufactured. The ribs 130 or the first ribs 130a may be easily machined by casting that enables accurate machining.

Besides the above casting, the film cooling element 100 may be machined by one of electric discharge machining, three-dimensional printing, and laser machining.

In the present embodiment, the film cooling element 100 may be installed in the turbine having the turbine blade 33, in which case it is possible to stably maintain the cooling efficiency of the turbine blade 33 coming into contact with hot gas and improve a cooling effect through film cooling.

Hereinafter, a gas turbine blade according to a second embodiment of the present disclosure will be described with reference to the accompanying drawings.

Referring to FIG. 23, the gas turbine blade includes a turbine blade 330 provided in a turbine, first film cooling elements 1020 formed in a leading edge 340 to cool the turbine blade 330, and second film cooling elements 1000 provided in a pressure side 330a and a suction side 330b of the turbine blade 330.

The first and second film cooling elements 1020 and 1000 perform film cooling on the surface of the turbine blade 330 coming into contact with hot gas flowing along the outer peripheral surface thereof.

In the first and second film cooling elements 1020 and 1000, film cooling is realized by exchanging heat on the surface of the turbine blade 330 when cooling air is supplied thereto and reducing the high temperature of hot gas to a predetermined temperature while cooling air is stably dispersed toward the surface of the turbine blade 330.

The first and second film cooling elements 1020 and 1000 are advantageous to uniformly maintain cooling efficiency since they can minimize a non-uniform flow due to separation in the internal regions of first and second outlets 1020b and 1200 to be described later when cooling air flows to the outer peripheral surface of the turbine blade 330 through the first and second outlets 1020b and 1200.

In the present disclosure, since first and second ribs 1300a and 1300 are respectively included in the first and second outlets 1020b and 1200 to uniformly maintain the flow of cooling air, it is possible to minimize an unstable flow due to separation and simultaneously enhance the flow stability of cooling air.

Each of the first film cooling elements 1020 includes a first cooling channel 1020a through which cooling air passes, and a first outlet 1020b that extends from the longitudinally extended end of the first cooling channel 1020a to the outer surface of the turbine blade 330 and has a width increased from one end of the first cooling channel 1020a to the outer surface of the turbine blade 330.

In addition, the first film cooling element 1020 includes a plurality of first ribs 1300a arranged to face each other on the inner walls of the first outlet 1020*b* and guiding cooling air to flow toward the first outlet 1020*b* in a vortex form.

The first cooling channel 1020*a* has one of circular, elliptical, and cylindrical shapes and extends toward the first outlet 1020*b*, and the first outlet 1020*b* has a divergence angle α and expands elliptically outward from the rear end of the first cooling channel 1020*a*.

The plurality of first ribs 1300*a* are arranged at regular intervals toward the outer peripheral surface as the outer surface of the turbine blade 330 along the inner walls 1021*c* and 1020*d* of the first outlet 1020*b*. For example, the number of first ribs 1300*a* is equal to that illustrated in the drawings and the first ribs 1300*a* face each other on the inner walls 1021*c* and 1022*d*.

When the length of each first rib 1300*a* protruding inward of the first outlet 1020*b* on each of the inner walls 1021*c* and 1022*d* is defined as a protruding length e, the distance between one first rib 1300*a* and another first rib 1300*a* may be equal to or greater than 5e.

The protruding length e of each first rib 1300*a* and the distance between the first ribs 1300*a* affect heat transfer performance. Accordingly, the distance between the first ribs 1300*a* is set as the above distance since it is advantageous that the distance between the first ribs 1300*a* is equal to or greater than 5e rather than less than 5e to transfer a larger amount of heat for cooling. When the distance between the centers of the spaced first ribs 1300*a* is defined as a separation pitch p, the p/e may be equal to or greater than 5 mm.

The p/e is preferably equal to or greater than at least 5 mm to guide the stable and spiral flow of cooling air. If the p/e is less than the above distance, the flow stability of cooling air may be degraded.

In another example, when the length of each first rib 1300*a* protruding inward of the first outlet 1020*b* is defined as a protruding length e and the distance between the centers of the spaced first ribs 1300*a* is defined as a separation pitch p, the p/e may be 5 mm to 10 mm.

In the present example, the p/e is maximum 10 mm and is set to be the above range, considering that the protruding length e and the separation pitch p vary in various manners.

When the total length from a front end 1020*aa* to a rear end 1020*bb* of the first outlet 1020*a* is defined as "L", the plurality of first ribs 1300*a* are arranged to the rear end 1020*bb* from a position spaced from the front end 1020*aa* by ⅕×L.

In the first outlet 1020*b*, a flow of cooling air is kept uniform in the front end 1020*aa* compared to the rear end 1020*bb* and separation begins around a position spaced toward the rear end 1020*bb* from the front end 1020*aa* by ⅕×L. Therefore, it is possible to minimize an unstable flow due to the separation when the first ribs 1300*a* are arranged from the position.

In the present embodiment, the first ribs 1300*a* have the same protruding length e in the first outlet 1020*b* or the protruding lengths e of the first ribs 1300*a* may increase toward the transverse center of the first outlet 1020*b* from the front end 1020*aa* to the rear end 1020*bb* of the first outlet 1020*b*.

In the latter case, the area of the rear end 1020*bb* increases and a flow in the transverse center of the first outlet 1020*b* may be unstable compared to that in the front end 1020*aa*. Therefore, it is possible to guide a stable flow of cooling air by increasing the protruding lengths e of the first ribs 1300*a*.

One end of the first cooling channel 1020*a* is connected to the inside of the turbine blade 330 for introduction of cooling air, and the other end thereof extends outward of the turbine blade 330 and has a circular cross-section but may have an elliptical shape.

In the present embodiment, the first outlet 1020*b* has a divergence angle α and expands elliptically in the transverse direction thereof from the rear end of the first cooling channel 1020*a*.

The first cooling channel 1020*a* has a cylindrical shape and extends toward the first outlet 1020*b*, and the divergence angle α is equal to or greater than 15°.

The divergence angle α is set as the above angle in order to suppress an occurrence of separation and guide a stable flow before cooling air is supplied to the surface of the turbine blade 330 through the first outlet 1020*b*.

In the present embodiment, it is possible to cause a film cooling effect since a flow of cooling air is stably and optimally guided in the first cooling channel 1020*a* in the range in which the divergence angle α is from 15° to 40°.

In the drawings, the first ribs 1300*a* are arranged on each of the inner walls 1021*c* and 1022*d* and are symmetrical about the transverse center of the first outlet 1020*b*. The flow rate of cooling air may be reduced on the inner walls 1021*c* and 1022*d* when the cooling air flows along the internal region of the first outlet 1020*b*, thereby causing a separation phenomenon. Therefore, the plurality of first ribs 1300*a* are arranged on the inner walls.

When cooling air flows along the first cooling channel 1020*a* with a constant diameter and then flows to the first outlet 1020*b* in the internal region of the first outlet 1020*b*, separation may occur on the inner walls 1021*c* and 1022*d*.

It is most preferable that cooling air uniformly flow in the internal region of the first outlet 1020*b*, but the flow rate of cooling air is close to "0" (zero) on the inner walls 1021*c* and 1022*d* of the first outlet 1020*b*. Thus, the flow rate and viscosity of cooling air flowing on the inner walls 1021*c* and 1022*d* differ from those of cooling air flowing along the transverse center of the first outlet.

A separation phenomenon may occur due to the different flow rates of cooling air because the cooling air flowing along the transverse center does not rectilinearly flow forward in the internal region of the first outlet 1020*b* but flows at a relatively low velocity toward the inner walls 1021*c* and 1022*d*. Accordingly, the present disclosure includes the first ribs 1300*a* to minimize this separation phenomenon.

In order to minimize the separation occurring in the internal region of the first outlet 1020*b*, the present disclosure causes an eddy phenomenon in which a small vortex is formed when cooling air flow through the first ribs 1300*a* installed on the inner walls 1021*c* and 1022*d*.

The eddy phenomenon enables cooling air to stably flow by preventing the unnecessary separation of the cooling air flowing along the inner walls 1021*c* and 1022*d* of the first outlet 1020*b*. In addition, it is possible to enhance the overall cooling performance of the turbine blade 330 by improving heat transfer performance when cooling air is supplied to the surface of the turbine blade 330 through the first outlet 1020*b*.

The first film cooling elements 1020 are formed in the leading edge 340 of the outer peripheral surfaces of the turbine blade 330 to perform film cooling on the surface of the leading edge 340 coming into contact with hot gas.

In each of the first film cooling elements 1020, film cooling is realized by exchanging heat on the surface of the leading edge 340 of the turbine blade 330 when cooling air is supplied through the first outlet 1020*b* and reducing the high temperature of hot gas to a predetermined temperature while cooling air is stable dispersed toward the surface of the leading edge 340 of the turbine blade 330.

The first film cooling element 1020 is advantageous to uniformly maintain cooling efficiency since it can minimize a non-uniform flow due to separation in the internal region of the first outlet 1020b when cooling air flows to the leading edge 340 of the turbine blade 330 through the first outlet 1020b.

Since the present disclosure includes the first ribs 1300a on the inner walls 1021c and 1022d to maintain a uniform flow of cooling air in the first outlet 1020b, it is possible to minimize an unstable flow due to separation and simultaneously enhance the flow stability of cooling air.

Unlike the above-mentioned ribs 130, the first ribs 1300a are spirally arranged along the inner walls 1021c and 1022d of the first outlet 1020b. This is to guide cooling air to spirally flow toward the surface of the turbine blade 330 in the first outlet 1020b.

The first ribs 1300a face each other and each have a C-ring shape. In the case where each of the first ribs 1300a has a C-ring shape, a first flow occurs in which a portion of cooling air flows along the inner walls 1021c and 1022d, and a second flow occurs in which a portion of cooling air flows along the C-shaped first ribs 1300a.

In this case, cooling air flows toward the turbine blade 330 in a spiral vortex form and is then injected onto the surface of the turbine blade 330. In this case, since the cooling air flows in the state in which it is in contact with the inner walls 1021c and 1022d of the first outlet 1020b, an unstable flow due to separation is suppressed on the inner walls 1021c and 1022d.

In the present embodiment, the first ribs 1300a may guide cooling air to flow in a spiral vortex form, and may change the flow of cooling air as illustrated in the drawings in the first outlet 1020b in which the main flow of cooling air occurs. Therefore, it is possible to effectively realize the cooling of the leading edge 340 maintained at high temperature.

In particular, since the leading edge 340 corresponds to a portion coming into initial contact with hot gas, the film cooling of the leading edge 340 may be unstably performed or the surface temperature of the leading edge 340 may be rapidly increased due to hot gas.

If the surface temperature of the leading edge 340 is increased even though the pressure side 330a and the suction side 330b are stably cooled, the overall cooling efficiency of the turbine blade 330 may be reduced.

However, it is possible to improve the overall cooling performance of the turbine blade 330 by stably cooling the leading edge 340 and to stably cool the turbine blade 330 by guiding cooling air to spirally flow through the first film cooling elements 1020 formed in the leading edge 340 for a reduction in separation in the present embodiment.

The first outlet 1020b may have a longitudinal length greater than the first cooling channel 1020a. This is because it is advantageous to increase the swirl of cooling air and maintain the spiral vortex flow thereof on the surface of the turbine blade 330.

For example, if the first outlet 1020b has a shorter length than the first cooling channel 1020a, it may be difficult to maintain the spiral vortex flow of cooling air.

To prevent this issue, the first outlet 1020b is configured such that the spiral swirl of cooling air stably occurs while the cooling air passes through the first ribs 1300a. Therefore, this spiral vortex flow can be maintained even when cooling air is injected onto the surface of the turbine blade 330.

The first ribs 1300a face each other and each have a C-ring shape. This is because it is advantageous that the first rib 1300a has a ring shape or a C shape to maintain the spiral vortex flow of cooling air.

The first rib 1300a may have a ring shape or it may be preferable that the first rib 1300a have a C shape illustrated in the drawings for easy machining when the first outlet 1020b has a small internal region, but the present disclosure is not limited thereto.

For example, the first ribs 1300a may have different shapes that enable the flow of cooling air to be easily changed to a spiral flow.

In the embodiment of the present disclosure, each of the second film cooling elements 1000 includes a second cooling channel 1100 through which cooling air passes, a second outlet 1200 that extends from the longitudinally extended end of the second cooling channel 1100 to the outer surface of the turbine blade 330 and has a width increased from one end of the second cooling channel 1100 to the outer surface of the turbine blade 330, and a plurality of second ribs 1300 facing each other on the inner walls of the second outlet 1200.

The second film cooling element 1000 are provided to cool the pressure side 330a and suction side 330b of the turbine blade 330, and causes an eddy phenomenon in which a small vortex is formed when cooling air flow through the second ribs 1300 installed on the inner walls 1210 and 1220 in order to minimize the separation occurring in the internal region of the second outlet 1200.

The eddy phenomenon enables cooling air to stably flow by preventing the unnecessary separation of the cooling air flowing along the inner walls 1210 and 1220 of the second outlet 1200.

In addition, it is possible to enhance the overall cooling performance of the turbine blade 330 by improving heat transfer performance when cooling air is supplied to the surface of the turbine blade 330 through the second outlet 1200.

Unlike the separation phenomenon in which a significantly large vortex is formed in cooling air, a small vortex is formed in cooling air on the inner walls 1210 and 1220 in the eddy phenomenon.

This small vortex does not affect the overall flow of cooling air but it guides the flow direction of cooling air to the transverse center of the second outlet 1200 on the inner walls 1210 and 1220.

In the present embodiment, the plurality of second ribs 1300 are formed on the inner walls 1210 and 1220 for utilization of the eddy phenomenon described with reference to FIGS. 5 and 6. Thus, it is possible to minimize a separation phenomenon, which may unnecessarily occur due to a specific divergence angle, by guiding a uniform flow of cooling air in the transverse center of the second outlet 1200, thereby ensuring that the flow of the cooling air is stably guided.

In addition, it is possible to simultaneously improve heat transfer performance while cooling air uniformly flows to the surface of the turbine blade 330 through the second outlet 1200.

The second film cooling elements 1000 are disposed at different positions of each of the pressure side 330a and suction side 330b of the turbine blade 330, and these positions correspond to positions at which hot gas flows along the surface of the turbine blade 330.

A film cooling effect is stably maintained on the pressure side 330a and the suction side 330b while cooling air flows along the surface of the turbine blade 330, with the consequence that the film cooling of the turbine blade 330 can be realized.

By way of example, for the realization of film cooling in the present embodiment, the second film cooling elements 1000 may be arranged at different intervals in the section from the leading edge 340 to the trailing edge 350 of the turbine blade 330.

For the second film cooling elements 1000 arranged on the pressure side 330a and suction side 330b of the turbine blade 330, a large number of second film cooling elements may be intensively arranged in a high-temperature section and a small number of second film cooling elements may be arranged in a relatively low-temperature section.

The second film cooling elements 1000 are provided in each of first- and second-stage turbine blades of a plurality of unit turbine blades constituting the turbine blade 330. The first- and second-stage turbine blades correspond to parts with which the hot gas having passed through the combustor comes into direct or indirect contact.

In this case, a cooling effect may vary depending on the flow trajectory and temperature distribution of hot gas flowing along the pressure side 330a and the suction side 330b. However, in the present embodiment, a film cooling effect on the surface of the turbine blade 330 can be improved, for example, by configuring the layout or distribution of the second film cooling elements in a different manner on the pressure side 330a and the suction side 330b.

Thus, since the film cooling effect on the surface of the turbine blade 330, which comes into contact with hot gas, is improved, it is possible to prevent the deformation of the turbine blade even though it is used for a long time.

Each of the second film cooling elements 1000 largely includes a second cooling channel 1100 and a second outlet 1200, and the second cooling channel 1100 may have a length four to eight times the diameter D thereof. The diameter D is, but not limited to, for example, 0.6 mm to 1.0 mm, and may be changed in various manners depending on the specification of the gas turbine.

The second outlet 1200 has an angle of inclination α of 30° to 40°, which is formed by the longitudinal center line of the second outlet 1200 and the surface of the turbine blade 330.

If the angle of inclination α is less than the above angle, the second cooling channel 1100 may be unnecessarily elongated. If the angle of inclination α is greater than the above angle, cooling air may not be injected onto the surface of the turbine blade 330 or only a portion of the cooling air may flow to the surface of the turbine blade 330. Accordingly, it is possible to cause a stable film cooling effect on the turbine blade 330 only when the angle of inclination α is set as the above angle.

The second outlet 1200 is expanded at an angle of 15° to 20° in both lateral directions from the second cooling channel 1100. The divergence angle, at which cooling air is injected onto the surface of the turbine blade 330, may be changed depending on the expanded angle of the second outlet 1200, and this angle is an angle that may optimally maintain the film cooling effect on the surface of the turbine blade 330.

Thus, the angle of the second outlet 1200 is set as an angle of 15° to 20° such that a maximum film cooling effect can be maintained by injecting cooling air onto the surface of the turbine blade 330 to realize effective cooling.

In the present embodiment, since the first and second film cooling elements 1020 and 1000 are provided in the turbine blade 330, the efficiency of the gas turbine can be enhanced by stably cooling the turbine blades 330 coming into contact with hot gas.

Hereinafter, a gas turbine blade according to a third embodiment of the present disclosure will be described with reference to the accompanying drawings.

Referring to FIGS. 24 and 25, the gas turbine blade according to the present embodiment includes a turbine blade 330 provided in a turbine, film cooling elements 1000A provided in a pressure side 330a and a suction side 330b of the turbine blade 330, and leading edge cooling elements 2000, each having an opening 2100, which is open at a leading edge 340, and protrusions 2200 arranged in a spiral form in the opening 2100 to guide cooling air in a vortex form for cooling of the turbine blade 330.

The openings 2100 of the leading edge cooling elements 2000 are open at different positions and in different directions according to the temperature distribution of the leading edge 340.

The film cooling elements 1000A of the present embodiment are similar to those of the above-mentioned first and second embodiments, but the present embodiment differs from the first and second embodiments in that the cooling efficiency of the gas turbine is enhanced by stably cooling the leading edge 340 of the turbine blade 330 through the leading edge cooling elements 2000.

The present embodiment is aimed at performing film cooling on the leading edge 340 by injecting cooling air onto the surface of the leading edge 340 or improving the film cooling efficiency of the leading edge 340 by forming the openings 2100 at different positions and in different directions.

The opening 2100 of each of the leading edge cooling elements 2000 has one of cylindrical, elliptical, and trapezoidal shapes. For example, in the case where the opening 2100 has a cylindrical shape, film cooling may be performed on the surface of the leading edge 340 by allowing cooling air to flow at a flow rate proportional to the diameter of the cylindrical opening 2100.

The leading edge cooling element 200 has a constant diameter in the longitudinal direction thereof to the opening 2100 from the turbine blade 330, and the protrusions 220 are arranged at regular intervals.

The protrusions 2200 may be formed by tapping together when the opening 2100 is formed. In this case, the opening 2100 may be open in a direction inclined at a specific angle.

The tapping is an easy machining method used to machine female screws such as nuts, and enables the leading edge cooling elements 2000 to be directly formed on the leading edge 340 by machines or worker's handwork.

In addition, since a large number of leading edge cooling elements 2000 may be machined with ease together with the leading edge 340 of the turbine blade 330, it is possible to realize an improvement in work efficiency and mass production.

The protrusions 2200 are formed longitudinally inward of the leading edge cooling element 2000, and are simultaneously formed by tapping. Therefore, they may be easily formed compared to casting or laser machining.

The distance between the protrusions 2200 may be changed by a tool 6 mounted for tapping, and this distance is set as a specific distance considering film cooling by cooling air injected onto the surface of the leading edge 340 through the protrusions 2200.

The leading edge cooling elements 2000 may be easily machined once or more with the use of the tool 6 by the worker.

The protrusions 2200 may be arranged, for example, in a spiral form, in which case they may be formed inward of the opening 2100.

The protrusions 2200 may be arranged to face each other in a semicircular ring form longitudinally inward of the opening 2100, or may be arranged limitedly only in a partial section.

In particular, in the case where the protrusions 2000 are machined by tapping, it is possible to improve a film cooling effect by machining the protrusions 2200 in different shapes according to the position of the leading edge 340 using the tool previously manufactured in various forms.

For example, the worker may perform machining by selectively changing the position and direction of the opening 2100 such that cooling air is injected to a position maintained at high temperature according to the temperature distribution data on the surface of the leading edge 340.

That is, the worker may easily machine the openings 2100 by tapping such that the openings 2100 are open at different positions and in different directions according to the temperature distribution at the front upper and lower portions and the center of the leading edge 340.

In this case, it is preferable that the portion of the leading edge 340, at which the opening 2100 is machined by tapping, be displayed in a different color or by a separate marker (not shown) such that the worker may visually recognize the above portion for each section according to the temperature distribution before the opening 2100 is machined by tapping.

For example, in the case where the portion of the leading edge 340 to be machined is displayed in a different color, the worker may perform tapping with accuracy without confusion since only that portion is machined by tapping using a different tool.

After the worker machines the leading edge cooling elements 2000 of the turbine blade 330 by tapping, all chips are removed from the openings 2100 to prevent partial blockage in the opening 2100.

The outward protruding lengths of the protrusions 2200 may increase toward the opening 2100, in which case the flow stability of cooling air is improved and the spiral vortex flow thereof is stably realized. Therefore, it is possible to more effectively realize film cooling.

Each of the film cooling elements 1000A includes a cooling channel 1100 through which cooling air passes, an outlet 1200 that extends from the longitudinally extended end of the cooling channel 1100 to the outer surface of the turbine blade 330 and has a width increased from one end of the cooling channel 1100 to the outer surface of the turbine blade 330, and a plurality of ribs 1300 facing each other on the inner walls of the outlet 1200.

The outlet 1200 has inner walls 1210 and 1220 formed to face each other therein, and the ribs 1300 are arranged on the inner walls 1210 and 1220 as illustrated in the drawings.

The film cooling element 1000A performs film cooling on the surface of the turbine blade 330 coming into contact with hot gas flowing along the outer peripheral surface thereof.

In the film cooling element 1000A, film cooling is realized by exchanging heat on the surface of the turbine blade 330 when cooling air is supplied through the outlet 1200 and reducing the high temperature of hot gas to a predetermined temperature while cooling air is stably dispersed toward the surface of the turbine blade 330.

Especially, the film cooling element 1000A is advantageous to uniformly maintain cooling efficiency since it can minimize a non-uniform flow due to separation in the internal region of the outlet 1200 when cooling air flows to the outer peripheral surface of the turbine blade 330 through the outlet 1200.

Since the present disclosure includes the ribs 1300 on the inner walls 1210 and 1220 to maintain a uniform flow of cooling air in the outlet 1200, it is possible to minimize an unstable flow due to separation and simultaneously enhance the flow stability of cooling air.

The plurality of ribs 1300 are arranged at regular intervals toward the outer peripheral surface as the outer surface of the turbine blade 330 along the inner walls 1210 and 1220 of the outlet 1200. For example, the number of ribs 1300 is equal to that illustrated in the drawings and the ribs 1300 face each other on the inner walls 1210 and 1220.

When the length of each rib 1300 protruding inward (i.e., to the center of the outlet) on each of the inner walls 1210 and 1220 is defined as a protruding length e, the distance between one rib 1300 and another rib 1300 may be equal to or greater than 5e.

The protruding length e of each rib 1300 and the distance between the ribs 1300 affect heat transfer performance. Accordingly, the distance between the ribs 1300 is set as the above distance since it is advantageous that the distance between the ribs 1300 is equal to or greater than 5e rather than less than 5e to transfer a larger amount of heat for cooling. For reference, since the protruding length e of each rib 1300 varies depending on the size of the outlet 1200, it is set through separate analysis or simulation.

When the total length from a front end 1200a to a rear end 1200b of the outlet 1200 is defined as "L", the plurality of ribs 1300 are arranged to the rear end 1200b from a position spaced from the front end 1200a by ⅕×L.

In the outlet 1200, a flow of cooling air is kept uniform in the front end 1200a compared to the rear end 1200b and separation begins around a position spaced toward the rear end from the front end 1200a by ⅕×L. Therefore, it is possible to minimize an unstable flow due to the separation when the ribs 1300 are arranged from the position.

Referring to FIG. 26, in the present embodiment, the ribs 1300 have the same protruding length e in the outlet 1200 or the protruding lengths e of the ribs 1300 may increase toward the transverse center of the outlet 1200 from the front end 1200a to the rear end 1200b of the outlet 1200.

In the latter case, the area of the rear end 1200b increases and a flow in the transverse center of the outlet 1200 may be unstable compared to that in the front end 1200a. Therefore, it is possible to guide a stable flow of cooling air by increasing the protruding lengths e of the ribs 1300.

One end of the cooling channel 1100 is connected to the inside of the turbine blade 330 for introduction of cooling air, and the other end thereof extends outward of the turbine blade 330 and has a circular cross-section but may have an elliptical shape.

In the present embodiment, the outlet 1200 has a divergence angle α and expands elliptically in the transverse direction thereof from the rear end of the cooling channel 1100.

The cooling channel 1100 has a cylindrical shape and extends toward the outlet 1200, and the divergence angle α is equal to or greater than 15°.

The divergence angle α is set as the above angle in order to suppress an occurrence of separation and guide a stable flow before cooling air is supplied to the surface of the turbine blade 330 through the outlet 1200.

In the present embodiment, it is possible to cause a film cooling effect since a flow of cooling air is stably and optimally guided in the cooling channel 1100 in the range in which the divergence angle α is from 15° to 40°.

In the present embodiment, it is possible to reduce separation occurring while cooling air flows and guide a uniform flow of cooling air flowing along the center of the outlet 1200 by the ribs 1300 together with the divergence angle.

In the drawing, the ribs 1300 are arranged on each of the inner walls 1210 and 1220 and are symmetrical about the transverse center of the outlet 1200. The flow rate of cooling air may be reduced on the inner walls 1210 and 1220 when the cooling air flows along the internal region of the outlet 1200, thereby causing a separation phenomenon. Therefore, the plurality of ribs 1300 are arranged on the inner walls.

When cooling air flows along the cooling channel 1100 with a constant diameter and then flows to the outlet 1200 in the internal region of the outlet 1200, separation may occur on the inner walls 1210 and 1220.

It is most preferable that cooling air uniformly flow in the internal region of the outlet 1200. However, a separation phenomenon may occur due to the difference between the flow rate and viscosity of cooling air flowing on the inner walls 1210 and 1220 and the flow rate and viscosity of cooling air flowing along the transverse center of the outlet.

In particular, since the flow rate of cooling air is close to "0" (zero) on the inner walls 1210 and 1220 of the outlet 1200, the flow rate of cooling air flowing on the inner walls 1210 and 1220 differs from that of cooling air flowing along the transverse center of the outlet.

A separation phenomenon may occur due to the different flow rates of cooling air because the cooling air flowing along the transverse center does not rectilinearly flow forward in the internal region of the outlet 1200 but flows at a relatively low velocity toward the inner walls 1210 and 1220. Accordingly, the present disclosure includes the ribs 1300 to minimize this separation phenomenon.

In order to minimize the separation occurring in the internal region of the outlet 1200, the present disclosure causes an eddy phenomenon in which a small vortex is formed when cooling air flow through the ribs 1300 installed on the inner walls 1210 and 1220.

The eddy phenomenon enables cooling air to stably flow by preventing the unnecessary separation of the cooling air flowing along the inner walls 1210 and 1220 of the outlet 1200. In addition, it is possible to enhance the overall cooling performance of the turbine blade 330 by improving heat transfer performance when cooling air is supplied to the surface of the turbine blade 330 through the outlet 1200.

Unlike the separation phenomenon in which a significantly large vortex is formed in cooling air, a small vortex is formed in cooling air on the inner walls 1210 and 1220 in the eddy phenomenon. This small vortex does not affect the overall flow of cooling air but it guides the flow direction of cooling air to the transverse center of the outlet 1200 on the inner walls 1210 and 1220.

Especially, the vortex of cooling air is small around each of the ribs 1300 and the extent of the vortex becomes weak between the spaced ribs 1300.

In the present embodiment, the plurality of ribs 1300 are formed on the inner walls 1210 and 1220 for utilization of the eddy phenomenon. Thus, it is possible to minimize a separation phenomenon, which may unnecessarily occur due to a specific divergence angle, by guiding a uniform flow of cooling air in the transverse center of the outlet 1200, thereby ensuring that the flow of the cooling air is stably guided.

In addition, it is possible to simultaneously improve heat transfer performance while cooling air uniformly flows to the surface of the turbine blade 330 through the outlet 1200.

The film cooling elements 1000A are disposed at different positions of each of the pressure side 330a and suction side 330b of the turbine blade 330, and these positions correspond to positions at which hot gas flows along the surface of the turbine blade 330.

A film cooling effect is stably maintained on the pressure side 330a and the suction side 330b while cooling air flows along the surface of the turbine blade 330, with the consequence that the film cooling of the turbine blade 330 can be realized.

By way of example, for the realization of film cooling in the present embodiment, the film cooling elements 1000A may be arranged at different intervals in the section from the leading edge 340 to the trailing edge 350 of the turbine blade 330.

For the film cooling elements 1000A arranged on the pressure side 330a and suction side 330b of the turbine blade 330, a large number of film cooling elements may be intensively arranged in a high-temperature section and a small number of film cooling elements may be arranged in a relatively low-temperature section.

The film cooling elements 1000A are provided in each of first- and second-stage turbine blades of a plurality of unit turbine blades constituting the turbine blade 330. The first- and second-stage turbine blades correspond to parts with which the hot gas having passed through the combustor comes into direct or indirect contact.

In this case, a cooling effect may vary depending on the flow trajectory and temperature distribution of hot gas flowing along the pressure side 330a and the suction side 330b. However, in the present embodiment, a film cooling effect on the surface of the turbine blade 330 can be improved, for example, by configuring the layout or distribution of the film cooling elements in a different manner on the pressure side 330a and the suction side 330b.

Thus, since the film cooling effect on the surface of the turbine blade 330, which comes into contact with hot gas, is improved, it is possible to prevent the deformation of the turbine blade even though it is used for a long time.

Each of the film cooling elements 1000A largely includes a cooling channel 1100 and an outlet 1200, and the cooling channel 1100 may have a length four to eight times the diameter D thereof. The diameter D is, but not limited to, for example, 0.6 mm to 1.0 mm, and may be changed in various manners depending on the specification of the gas turbine.

A maximum film cooling effect can be obtained on the turbine blade 330 when the diameter D of the cooling channel 1100 is 0.6 mm and the length of the cooling channel 1100 is 2.4 mm in an example, and a heat transfer effect can thus be stably maintained.

The cooling channel 1100 may have a maximum length of 4.8 mm, but the present disclosure is not necessarily limited thereto when the cooling channel 1100 has a length four to eight times the diameter D thereof.

The outlet 1200 has an angle of inclination α of 30° to 40°, which is formed by the longitudinal center line of the outlet 1200 and the surface of the turbine blade 330.

If the angle of inclination α is less than the above angle, the cooling channel 1100 may be unnecessarily elongated. If the angle of inclination α is greater than the above angle, cooling air may not be injected onto the surface of the turbine blade 330 or only a portion of the cooling air may flow to the surface of the turbine blade 330. Accordingly, it is possible to cause a stable film cooling effect on the turbine blade 330 only when the angle of inclination α is set as the above angle.

The outlet 1200 is expanded at an angle of 15° to 20° in both lateral directions from the cooling channel 1100. The divergence angle, at which cooling air is injected onto the surface of the turbine blade 330, may be changed depending on the expanded angle of the outlet 1200, and this angle is an angle that may optimally maintain the film cooling effect on the surface of the turbine blade 330.

Thus, the angle of the outlet 1200 is set as an angle of 15° to 20° such that a maximum film cooling effect can be maintained by injecting cooling air onto the surface of the turbine blade 330 to realize effective cooling.

INDUSTRIAL APPLICABILITY

A gas turbine blade according to exemplary embodiments of the present disclosure includes a plurality of ribs effectively arranged to stably cool film cooling elements due to hot gas, thereby realizing the cooling of the film cooling elements.

The invention claimed is:

1. A gas turbine blade comprising:
a turbine blade having an outer surface; and
a plurality of film cooling elements, each film cooling element comprising:
a cooling channel having one end through which cooling air is introduced to the film cooling element,
an outlet longitudinally extending from the cooling channel to the outer surface of the turbine blade in order to discharge the cooling air, the outlet having a width between opposite inner walls that increase from the cooling channel to the outer surface of the turbine blade, and
a plurality of ribs respectively arranged on the opposite inner walls of the outlet,
wherein each of the plurality of ribs is configured to pass cooling air through an opening hole formed through the rib, and the opening hole is open toward an associated one of the inner walls of the outlet.

2. The gas turbine blade according to claim 1, wherein the cooling channel has a cylindrical shape extending from the outlet, and the outlet has a divergence angle (α) with respect to the cooling channel and latitudinally expands outward from the cooling channel.

3. The gas turbine blade according to claim 2, wherein the divergence angle (α) ranges from 15° to 40°.

4. The gas turbine blade according to claim 1, wherein the plurality of ribs respectively protrude from the opposite inner walls of the outlet, and each rib has a protruding length (e) that is one of an equal length and a gradually increasing length from the cooling channel to the outer surface of the turbine blade.

5. The gas turbine blade according to claim 1, wherein the outlet has a total length L and a front end situated toward the outer surface of the turbine blade, and the ribs are spaced apart at intervals of ⅕×L and are arranged beginning from a position ⅕×L from the front end.

6. The gas turbine blade according to claim 1, wherein the outlet has an elliptical shape.

7. The gas turbine blade according to claim 1, further comprising:
a plurality of first film cooling elements formed in a leading edge of the turbine blade, each first film cooling element comprising:

a first cooling channel through which cooling air passes;
a first outlet extending from the first cooling channel to the leading edge of the turbine blade and having opposite inner walls; and
a plurality of first ribs respectively arranged on the opposite inner walls of the first outlet and configured to guide the cooling air from the first cooling channel through the first outlet in a vortex form.

8. The gas turbine blade according to claim 7, wherein the plurality of first ribs respectively protrude from the opposite inner walls of the first outlet, and each first rib has a C-ring shape and a protruding length (e), and
wherein the plurality of first ribs are spaced apart according to a separation pitch (p) established between centers of the C-ring shape of adjacently arranged first ribs of the plurality of first ribs, such that a distance p/e is 5 mm to 10 mm.

9. The gas turbine blade according to claim 7, wherein the plurality of first ribs are arranged longitudinally along each of the opposite inner walls of the first outlet so as to be disposed in an alternating manner.

10. The gas turbine blade according to claim 9, wherein the alternating manner of arrangement follows a spiral formed on the opposite inner walls of the first outlet.

11. The gas turbine blade according to claim 7, wherein the first outlet includes an extension section (S), a first extension section (S1) having a length of ½×S and extending from the first cooling channel, and a second extension section (S2) extending from the first extension section, and
wherein the plurality of first ribs are spaced apart from each other at intervals and are arranged in each of the first and second extension sections, the interval of the first ribs in the first extension section differing from the interval of the first ribs in the second extension section.

12. The gas turbine blade according to claim 11, wherein the plurality of first ribs are spaced apart according to a separation pitch (p) established between adjacently arranged first ribs of the plurality of first ribs, and the separation pitch between the first ribs in the first extension section is shorter than the separation pitch between the first ribs in the second extension section.

13. A gas turbine blade comprising:
a turbine blade having a pressure side, a suction side, and a leading edge;
a plurality of first film cooling elements configured to cool the turbine blade and provided in the leading edge of the turbine blade; and
a plurality of second film cooling elements configured to cool the turbine blade and respectively provided in the pressure side and the suction side of the turbine blade,
each first film cooling element comprising a first cooling outlet extending to the leading edge and a plurality of first ribs respectively located on opposite inner walls of the first cooling outlet,
wherein each of the plurality of first ribs is configured to pass cooling air through an opening hole formed therethrough, and the opening hole being open toward the first cooling outlet.

14. The gas turbine according to claim 13, wherein each of the first film cooling elements comprises:
a first cooling channel through which cooling air passes;
the first cooling outlet longitudinally extending from the first cooling channel to the leading edge of the turbine blade in order to discharge the cooling air, the first outlet having a width between opposite inner walls that increases from the first cooling channel to the leading edge of the turbine blade; and the plurality of first ribs respectively arranged on the opposite inner walls of the first outlet and configured to guide the cooling air from the first cooling channel through the first outlet in a vortex form.

15. The gas turbine blade according to claim 14, wherein the first cooling channel has a cylindrical shape extending from inside the turbine blade to the first outlet, and the first outlet has a divergence angle ($\alpha$) ranging from 15° to 40° with respect to the first cooling channel and latitudinally expands outward from the first cooling channel.

16. The gas turbine blade according to claim 14, wherein the plurality of first ribs are arranged longitudinally along each of the opposite inner walls of the first outlet so as to be disposed in a spiral form.

17. The gas turbine according to claim 13, wherein each of the second cooling elements comprises:

a second cooling channel through which cooling air passes;

a second outlet longitudinally extending from the second cooling channel to the pressure and suction sides of the turbine blade in order to discharge the cooling air, the second outlet having a width between opposite inner walls that increases from the second cooling channel to the pressure and suction sides of the turbine blade; and a plurality of second ribs respectively arranged on the opposite inner walls of the second outlet.

18. A gas turbine blade comprising:

a turbine blade having an outer surface and a leading edge;

a plurality of film cooling elements configured to cool the turbine blade and provided in the outer surface of the turbine blade; and a plurality of leading-edge cooling elements configured to cool the turbine blade and provided in the leading edge of the turbine blade, each leading-edge cooling element including:

an opening communicating with the leading edge, and at least one protrusion arranged in a spiral form and configured to protrude from an inner wall of the opening in order to guide cooling air in a vortex form, wherein the openings of the leading edge cooling elements are open at different positions and in different directions according to temperature distribution of the leading edge, wherein each of the plurality of film cooling elements comprising a cooling outlet extending to the leading edge and a plurality of ribs located on opposite inner walls of the cooling outlet, and wherein each of the plurality of ribs is configured to pass the cooling air through an opening hole formed therethrough, and the opening hole being open toward the cooling outlet.

19. The gas turbine blade according to claim 18, wherein each of the plurality of film cooling elements comprises:

a cooling channel through which cooling air passes;

an outlet longitudinally extending from the cooling channel to the outer surface of the turbine blade in order to discharge the cooling air, the outlet having a width between opposite inner walls that increases from the cooling channel to the outer surface of the turbine blade; and a plurality of ribs respectively arranged on the opposite inner walls of the outlet.

20. The gas turbine blade according to claim 19, wherein the cooling channel has a cylindrical shape extending from inside the turbine blade to the outlet, and the outlet has a divergence angle ($\alpha$) of 15° with respect to the cooling channel and latitudinally expands outward from the cooling channel.

* * * * *